United States Patent [19]
Saito et al.

[11] Patent Number: 5,504,825
[45] Date of Patent: Apr. 2, 1996

[54] OPTICAL FIBER SWITCHING DEVICE AND METHOD

[75] Inventors: Kazuhito Saito; Masayuki Nishimura; Tohru Yamanishi, all of Yokohama; Hideo Kobayashi; Toshiaki Katagiri, both of Mito; Masao Tachikura, Hitachi, all of Japan

[73] Assignees: Sumitomo Electric Industries, Ltd., Osaka; Nippon Telegraph and Telephone Corporation, Tokyo, both of Japan

[21] Appl. No.: 345,815

[22] Filed: Nov. 22, 1994

Related U.S. Application Data

[62] Division of Ser. No. 22,641, Feb. 25, 1993, Pat. No. 5,386,485.

[30] Foreign Application Priority Data

| Feb. 26, 1992 | [JP] | Japan | 4-039602 |
| Feb. 26, 1992 | [JP] | Japan | 4-039607 |
| Apr. 23, 1992 | [JP] | Japan | 4-104612 |
| May 11, 1992 | [JP] | Japan | 5-017484 |
| May 11, 1992 | [JP] | Japan | 4-117361 |
| May 21, 1992 | [JP] | Japan | 4-128777 |
| Feb. 4, 1993 | [JP] | Japan | 4-117363 |

[51] Int. Cl.$^6$ .................. G02B 6/24; B25J 11/00
[52] U.S. Cl. .................. 385/17; 385/20; 385/25; 385/71; 385/135; 901/16
[58] Field of Search .................. 385/16, 17, 20, 385/25, 71, 135, 136, 137; 901/14, 16, 23, 6

[56] References Cited

U.S. PATENT DOCUMENTS

| 4,193,662 | 3/1980 | Hara | 385/22 |
| 4,765,709 | 8/1988 | Suillerot et al. | 385/135 |
| 4,955,686 | 9/1990 | Buhrer et al. | 385/17 |
| 5,002,355 | 3/1991 | Caron | 385/16 X |
| 5,100,286 | 3/1992 | Anderson | 901/16 X |
| 5,243,872 | 9/1993 | Yang et al. | 901/16 X |

FOREIGN PATENT DOCUMENTS

| 0323920 | 7/1989 | European Pat. Off. . |
| 0463749 | 1/1992 | European Pat. Off. . |
| 8905509 | 7/1989 | Germany . |
| 3743108 | 7/1989 | Germany . |
| 58-14807 | 1/1983 | Japan . |

OTHER PUBLICATIONS

Yoshida et al, "A New Automated Main Distributing Frame System Using Robot", International Conference On Communications, vol. 2/3, 26 Jun. 1991, Denver, USA, pp. 977–982.

*Primary Examiner*—Rodney B. Bovernick
*Assistant Examiner*—Hemang Sanghavi
*Attorney, Agent, or Firm*—Cushman Darby & Cushman

[57] ABSTRACT

There is disclosed an optical fiber switching device having a coupling board comprising a plurality of first optical fibers connected to one surface of the coupling board in the arrangement to one surface of the coupling board, a plurality of second optical fibers connected to the another surface of the coupling board, an optical fiber length adjusting unit for handling surplus portions of the second optical fibers and switching unit for pulling out any one of the second optical fibers selected from the plural second optical fibers from the another surface of the connecting board and for connecting the any one optical fiber to different switching position of the another surface of the connecting board to coupling the any one optical fiber with any one of the first optical fibers.

20 Claims, 17 Drawing Sheets

OPTICAL FIBER SWITCHING DEVICE AND METHOD

This application is a divisional of application Ser. No. 08/022,641, filed on Feb. 25, 1993, now U.S. Pat. No. 5,386,485.

BACKGROUND OF THE INVENTION

1. Field of the Invention

This invention relates to an optical fiber switching device and method for selectively switching coupling between a plurality of first optical fibers and a plurality of second optical fibers which are respectively coupled with each other.

2. Related Background of Art

Recently there are found increasing developments in the field of optical communication. Taking into consideration the present circumstances that optical communication is introduced in main lines, it is urgently needed to make up large-scale wiring networks for coupling a number of optical fibers in matrix arrangements which are different from the conventional point-to-point relay transmission system.

A conventional optical fiber switching device comprises, although not illustrated here, a plurality of guide rails which are arranged perpendicular to each other, and slide terminals slidably mounted on the guide rails, and optical fibers respectively secured to the respective slide terminals, whereby the slide terminals are slid to couple required ones of the optical fibers (see "1×1000 Optical Switch for 10-Fiber Ribbon" Spring General Conference of The Institute of Electronics, Information and Communication Engineers (1989), ps. 4–238)

In this optical fiber switching device, surplus portions of optical fibers fed to the slide terminals are adjusted by an optical fiber length adjusting mechanism located outside.

On the other hand, another conventional optical fiber switching device comprises, although not illustrated, a number of first optical fibers arranged in a matrix on one side of a coupling board, and a number of second optical fibers arranged in matrix on another side of the coupling board, the first and the second optical fibers being coupled with each other.

In switching a selected one of the second optical fibers, inconveniently an operator selects a required one out of the second optical fibers, pull out the selected second optical fiber out of the coupling board, and couples the selected second optical fiber with a required one of the first optical fibers.

The conventional optical fiber switching devices having the above-described structure have the following disadvantages.

Firstly, when a plurality of optical fibers have to be coupled, the optical fibers congest the sides of the coupling board, with results that the coupling operational efficiency is lowered, and erroneous coupling frequently takes place.

Especially in switching one slide terminal to a required slide terminal, the congestion of a plurality of optical fibers is unavoidably a serious problem.

Secondly, the problem of the above-described congestion can be solved by securing a large space sufficient for the coupling, but unpreferably securing a large space makes a size of the devices large.

Thirdly, in accordance with an increase of a number of the slide terminals accompanied by that of a number coupling of optical fibers, the guide rails have to be extended, which is a problem from the viewpoint of the rigidity of the devices.

Fourthly, without the guide rails, it will become very difficult to maintain a connecting force of the connectors, and the congestion of neighboring optical fibers causes s problems.

Fifthly, since a master optical fiber connected to a slide terminal is coupled to one of a number of optical fibers arranged on a connector table in a matrix, the devices are not adaptable to large-capacity optical communication on the side of subscribers.

Sixthly, since an operator selects an arbitrary one of the second optical fibers and switches its connection, the maintenance is so inefficient that high running costs cannot be avoiced.

Finally, there is a considerable high possibility that when an operator selects and switch a required second optical fiber, the other optical fibers which have not been selected are damaged.

An object of this invention is to provide an optical fiber switching device which can solve the above-described problems.

SUMMARY OF THE INVENTION

To achieve the object of this invention, a first invention of this application relates to an optical fiber switching device including a plurality of first optical fibers connected in one surface of a coupling board in an arrangement and a plurality of second optical fibers connected in another surface of the coupling board and coupled respectively with the first optical fibers, the first optical fibers and the second optical fibers respectively opposed to each other being selectively switched to be opposed to different ones of the optical fibers, the device comprising optical fiber length adjusting means for handling surplus portions of the second optical fibers; partition means for dividing said another surface of the coupling board in a plurality of rows; switching means being movable along the rows for pulling out a selected one of the second optical fibers in a direction normal to said another surface of the coupling board, and connecting the pulled-out selected second optical fiber at a position on said another surface of the coupling board, to which the selected second optical fiber is to be switched, so as to couple the selected second optical fiber to a selected one of the first optical fibers.

To achieve the above-described object, a second invention of this application relates to an optical fiber switching method in which a plurality of first optical fibers are connected in one surface of a coupling board in an arrangement, a plurality of second optical fibers connected in another surface of the coupling board in an arrangement and coupled respectively with the first optical fibers, there is provided optical fiber length adjusting means for handling surplus portions of the second optical fibers, and the first optical fibers and the second optical fibers respectively opposed to each other are selectively switched by switching means to be coupled with different one of the optical fibers, the method comprising the step of pulling a selected second optical fiber in a direction substantially normal to the coupling board to uncouple the selected second optical fiber from the associated one of the first optical fibers; the step of taking up the selected second optical fiber into the optical fiber length adjusting means and position one end of the selected second optical fiber near the optical fiber length adjusting means; the stp of holding the end of the selected second optical fiber by switching means to draw out the second optical fiber to a position on the coupling board for the selected optical fiber to be switched to, and the step of coupling the selected second optical fiber to a selected one of the first optical fibers connected in the coupling board.

To achieve the above-described object, a third invention of this application relates to an optical fiber switching device including a plurality of first optical fibers connected in one surface of a coupling board in an arrangement and a plurality of second optical fibers connected in another surface of the coupling board and coupled respectively with the first optical fibers, the first optical fibers and the second optical fibers respectively opposed to each other being selectively switched to be opposed to different ones of the optical fibers, the device comprising a plurality of optical fiber holding units included in the coupling board for holding the second optical fibers in rows spaced from each other at a certain interval; partition means for dividing another surface of the coupling board in a plurality of rows; slide means for displacing one of the optical fiber holding units associated with a selected one of the second optical fibers in a direction of the rows of the second optical fibers inbetween the associated one of the rows and its adjacent one to displace the selected second optical fibers; and switching means being movable inbetween the associated row and its adjacent one for pulling out the selected second optical fiber displaced inbetween the rows in a direction normal to said another surface of the coupling board and connected the pulled-out selected second optical fiber in a position of said another surface of the coupling board to which the selected second optical fiber is to be switched to and coupling the selected second optical fiber with a selected one of the first optical fibers.

To achieve the above-described object, a fourth invention of this application relates to an optical fiber switching device including a plurality of first optical fibers connected in one surface of a coupling board in an arrangement and a plurality of second optical fibers connected in another surface of the coupling board and coupled respectively with the first optical fibers, the first optical fibers and the second optical fibers respectively opposed to each other being selectively switched to be opposed to different ones of the optical fibers, the device comprising a plurality of optical fiber holding units included in the coupling board for holding the second optical fibers in rows spaced from each other at a certain interval; partition means of dividing said another surface of the coupling board in a plurality of rows; slide means for displacing one of the optical fiber holding units associated with a selected one of the second optical fibers in a direction of the rows of the second optical fibers into the associated row and its adjacent one; switching means being movable inbeween the rows for pulling out the selected second optical fiber in a direction normal to said another surface of the coupling board and connecting the pulled-out selected second optical fiber at a position on said another surface of the coupling board for the selected second optical fiber to be switched to so as to couple the same with a selected one of the first optical fibers; and releasing means for allowing the second optical fibers to be pulled out of the coupling board by means of a release button projected from said another surfaces of the optical fiber holding units.

Each release means comprises a groove recessed in the associated optical fiber holding unit, a release button having a substantially cylindrical shape, inserted in the groove, and urged by a flexible means so as to be movable upward and downward and to have normally an upper part thereof to be pushed down by the switching means projected out of said another surface of the associated optical fiber holding unit release button is pushed down, a connector adaptor for holding one of the first optical fibers disposed inside the release button, a sleeve holder removably covering an upper part of the connector adaptor and coupling the associated one of the first optical fibers and one of the second optical fibers in a housing built therein, and a ferrule chuck inserted in the release button for covering the sleeve holder and holding the second optical fiber held in the insertion hole as the release button is pushed down.

The ferrule chuck comprises a substantially cylindrical main body of a flexible material having an open bottom, an insertion hole formed in the center of the main body and having a larger diameter than the ferrule connector on one ends of the second optical fibers, a plurality of grooves recessed in the main body around the insertion hole, a side wall of the main body split by the grooves for expanding and reducing the diameter of the insertion hole, and a slant portion formed on the lower peripheral surface of the main body and to be laid on a slant surface of the lower inside peripheral surface of the chuck release button, whereby as the slant surface of the chuck release button is pressed against the slant portion, the side wall is pressed against the second optical fiber to hold the same.

To achieve the above-described object, a fifth invention of this application relates to an optical fiber switching device comprising a plurality of first optical fibers connected in one surface of a coupling board in an arrangement; a plurality of second optical fibers connected in another surface of the coupling board in an arrangement; optical fiber length adjusting means for handling surplus portions of the second optical fibers; switching means for switching a selected one of the second optical fibers to switch the same; rotary means including a plurality of pairs of rotary gripping means for gripping the second optical fibers extended from the optical fiber length adjusting means; and selecting and carrying means for selecting one of the pairs of the rotary gripping means gripping the selected second optical fiber, and carrying a surplus portion of the selected second optical fiber to the optical fiber length adjusting means to accommodate the same there.

The selecting and carrying means comprises a rotary presser body to be slidably pressed against a drive rotary body of a selected one of the pairs of rotary gripping means, and constraining means to be pressed, while the selected pair of rotary gripping means is rotated, against the other ones of the pairs of the rotary gripping means neighboring the selected pair for constraining the rotation of the other pairs.

To achieve the above-described object, a sixth invention of this application relates to an optical fiber switching device comprising a plurality of first optical fibers connected in one surface of a coupling board in an arrangement and a plurality of second optical fibers connected in another surface of the coupling board and coupled respectively with the first optical fibers, the first optical fibers and the second optical fibers respectively opposed to each other being selectively switched to be opposed to different ones of the optical fibers, the device comprising switching means for holding a selected one of the second optical fibers to switch the same; guide means to be intruded inbetween one of rows of the second optical fibers on said another surface of the coupling board and its adjacent one; and guided means included in the switching means and displaceably guided by the guide means.

According to the first invention of this application having the above-described structure, the optical fiber length adjusting means handles surplus portions of the second optical fibers to prevent the entanglement of the second optical fibers. In addition, the partition means secure on the top surface of the coupling board a plurality of spaces for the switching means to intrude into. As results, the disadvantages of great drops of the coupling operational efficiency and frequent occurrences of coupling errors can be prevented.

It is not necessary to secure a sufficiently large space for the coupling. As a result, the problem that adversely the device is accordingly large-sized can be solved.

According to the second invention of this application having the above-described structure, the optical fiber length adjusting means handles surplus portions of the second optical fibers, and the second optical fibers are prevented from entangling with one another near the coupling board. A selected second optical fiber is taken up before the switching operation thereof to start its switching operation. A plurality of partition means divide and secure the top surface of the coupling board in a plurality of spaces for the switching means to be intruded into.

As results, the disadvantages that the coupling operational efficiency is much decreased, and erroneous coupling frequently occurs can be prevented, and a selected second optical fiber entangles with the other second optical fibers with the result that the switching operation is made difficult can be solved.

Furthermore, the problem that the device as a whole adversely becomes large-sized can be solved.

According to the third invention of this application having the above-described structure, a plurality of second optical fibers in an arrangement are divided in rows, and a selected one of the optical fiber holding units is displaced. As a result, the switching means can easier access to the second optical fibers.

In addition, the switching means can make access to a selected one of the second optical fibers without contacting to the second optical fibers. As a result, it is possible that the congestion of the optical fibers in coupling many of the optical fibers can be effectively prevented.

According to the fourth invention of this application having the above-described structure, as the release button is lowered, a force which has been acting radially inwardly on the side wall of the ferrule chuck is removed or weakened, and the ferrule chuck restores its original configuration. And the selected second optical fiber clamping state of the ferrule chuck is released.

As a result, the disadvantage that a selected second optical fiber is pulled out of the coupling board due to a cause, with the result that its coupling with a first optical fiber is released can be removed.

According to the fifth invention of this application having the above-described structure, the switching means selects one of the second optical fibers, and the selecting and carrying means carries the selected second optical fiber to the optical fiber length adjusting means to be taken up therein, whereby the selected second optical fiber is automatically switched. As results, the switching operational efficiency is much improved, and the running costs can be lowered. In addition, the maintenance operational efficiency can be much improved.

Furthermore, the constraining means perfectly brakes the rotation of the rotary gripping means which grip those of the second optical fibers which have not been selected. As a result, the non-selected second optical fibers can be prevented without failure from damages.

According to the sixth invention of this application having the above-described structure, the switching means is guided by the guide means in place of an operator to select one of the second optical fibers and switch the same. As a result, it is possible to much improve the switching operational efficiency and maintenance operational efficiency.

In addition, it can be expected that in selecting a required one of the second optical fibers and switching the same, the other second optical fibers which have not been selected are prevented from damages without failure.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

DETAILED DESCRIPTION OF THE PREFERRED EMBODIMENTS

Figure 1:
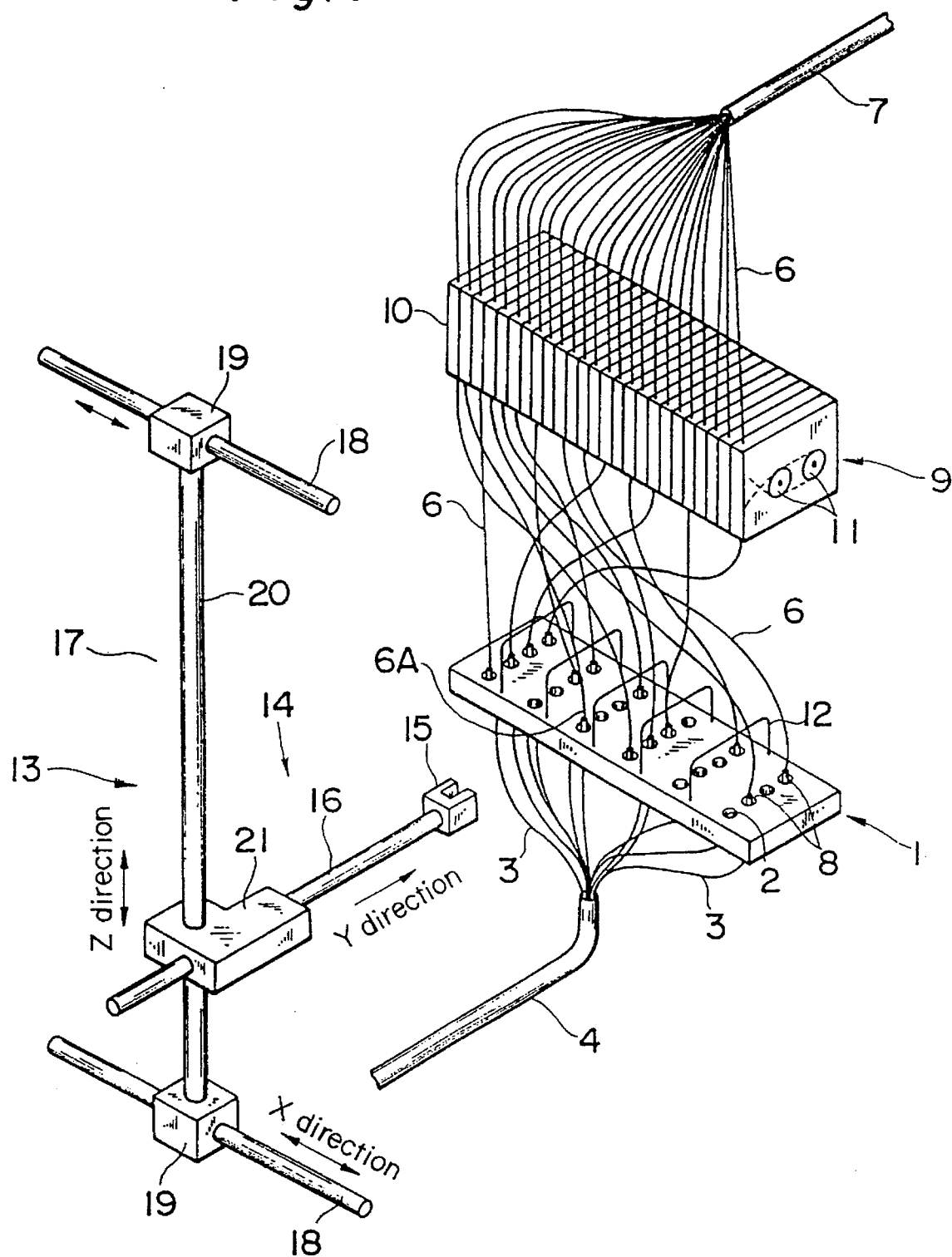
FIG. 1 is a general perspective view of the optical fiber switching device according to an embodiment of a first invention of this application.

An optical fiber switching device according to a first invention of this application will be explained by means of an embodiment shown in FIG. 1. In the following description common elements are represented by common reference numerals not to repeat their explanation.

The optical fiber switching device the first invention relates to comprises, as shown in FIG. 1, a coupling board 1, an optical fiber length adjusting unit 9, and partitioning rods 12 and a robot mechanism 13.

As shown in FIG. 1, the coupling board 1 is in the form of a substantially rectangular board and has a plurality of connector adaptor holes (not shown) formed vertically therethrough in a matrix arrangement. Connector adaptors 2 for coupling are fit in the respective connector adaptor holes.

As shown in FIG. 1, the connector adaptors 2 are formed in a 6 rows×4 columns arrangement which holds first optical fibers in a 6 rows×4 columns matrix arrangement.

As shown in FIG. 1, the first optical fibers 3 are enveloped in a bundle by a first optical cable 4 which is positioned horizontal below the coupling board 1, are exposed out of the envelope at the open upper end thereof bent upward, and then are curved toward the coupling board.

The respective first optical fibers 3 have one ends inserted in connectors (not shown) which are to be removably plugged from below into the connector adaptors 2. The respective connectors are plugged into or drawn out of the connector adaptors 2 by forces exerted in the directions of optical axes of the optical fibers.

As show in FIG. 1, the connection of the first optical fibers 3 to the connector adaptors 2 by the respective connectors brings the first optical fibers 3 into connection with a plurality of second optical fibers 6 to constitute a large scale of N×M optical switches.

The second optical fibers 6 are enveloped, as shown in FIG. 1, by a second optical cable 7 which is positioned horizontal above the coupling board 1, are exposed out of the open upper end of the second optical fiber 7, and are individually suspended, curved toward the coupling board 1.

As shown in FIG. 1, the second optical fibers 6 have the ends inserted in connectors 8 which are to be plugged into the connector adaptors 8 from above. The connectors 8 are plugged into or drawn out of the connector adpators 2 by forces exerted in the directions of optical axes of the second optical fibers 6.

When the connectors 8 of the second optical fibers 6 are coupled with the first optical fibers 3 as shown in FIG. 1, the lower part of the connectors 8 are in the coupling board 1 with the upper parts thereof exposed upward from the top surface of the coupling board 1.

The surface of each second optical fiber 6 and that of its connector 8 define a smooth and continuous surface without any step which hinders the disconnection of the second optical fiber 6.

Thus, the second optical fibers 6 are individually suspended from the second optical cable 7 through the optical fiber length adjusting unit 9, and when the connectors 8 are plugged into the connector adaptors 2, the second optical fibers 6 are coupled with the first optical fibers 3.

As shown in FIG. 1, the optical fiber length adjusting unit 9 comprises a plurality of optical fiber length adjusting blocks 10 of rectangular section which are laid on each other in the horizontal direction each with the largest sides set upright so as to make up a rectangular parallelopiped, and is horizontally positioned substantially directly above the coupling board 1.

A pair of rotatable reels 11 is provided in each optical fiber length adjusting block 10. The rotatable reels of each pair are urged separate from each other by, e.g. , a spring (not shown). Parts of the second optical fibers, i.e., surplus portions of the second optical fibers, are wound on their associated pair of reels.

The springs have a spring constant for generating a force in the Z-directional which is smaller than forces for connecting the connectors to couple the first and the second optical fibers 3, 6, so that the spring force can prevent the disconnection of the connectors.

When a second optical fiber 6 is payed out, the optical fiber length adjusting unit 9 rotates the associated reels 11 and downwardly pays out a required length of the optical fiber, so that the length of the second optical fiber 6 is adjusted for the prevention of the entanglement of the second optical fiber from the other second optical fibers on the coupling board 1.

The second optical fibers 6 are straight or curved near the underside of the optical fiber length adjusting unit 9.

Five partition rods 12 are inserted in the top surface of the coupling board 1 so as to divide the connector adaptors into six rows, i.e., the first optical fibers 3 in six rows.

Each partition rod 12 has the shape of a bracket sign as shown in FIG. 1, and both legs of the bracket-shaped rod 12 are inserted in a substantially downward U-shape respectively in holes formed in the coupling board 1 respectively near the first column and the fourth column.

Accordingly the top surface of the coupling board 1 is divided in 6 rows by the 5 partition rods 12, and 6 spaces into each of which a robot hand 14 of a robot mechanism 13 can horizontally intrude from the slant left to the slant right as viewed in FIG. 1 are secured.

As shown in FIG. 1, the robot mechanism 13 comprises the robot handle 14, a driving mechanism 17, a hand portion 15 of a structure which allows the connectors 8 exposed upward from the top surface of the coupling board 1 (e.g., a hand in the form of a substantially U-shaped member A), and an arm portion 16 which is movable forward and backward and has the hand portion 15 on the forward end.

The arm portion 16 is provided by a round rod, and a screw groove is formed in the outer periphery of the round rod member.

The driving mechanism 17 comprises a pair of X-directional screw rods 18 which are rotatably arranged horizontal, a pair of X-directional nuts 9 screw-engaged respectively on the pair of X-directional screw rods 19. a Z-directional screw rod 20 which is rotatably supported vertical between the pair of X-directional nuts 19, and a Z-directional nut 21 of substantially L-shaped cross-section which is screw-engaged with the Z-directional screw rod 20 and supports the arm portion 16 horizontal.

The X-directional screw rod 18 and the Z-directional screw rod 20 are rotatable independently of each other. The rotation of the X-directional rod 18 moves the robot hand 14 in the X direction, and the rotation of the Z-directional screw rod 20 moves the robot hand 14 up and down in the Z direction.

The Z-directional nut 21 has a conversion mechanism for changing rotary motion into reciprocating motion(e.g., a motor, worm gear or others) built in, and the operation of this conversion mechanism moves the arm portion 16 by a required length forward in the Y direction.

The rotating force of the Z-directional screw rod 20 is so set that a Z-directional force larger than at least a connection force between the connectors of the first and of the second optical fibers 2, 3 can be produced, whereby the lock of the connector can be sufficiently released.

Next the operation of the optical fiber switching device according to this embodiment will be explained.

In releasing the lock between the connectors of a first optical fiber 3 and of a required second optical fiber 6A which are optically coupled to each other, first the X-directional screw rod 18 and the Z-directional screw rod 20 are respectively rotated to move the robot hand 14 toward a required row the required second optical fiber 6A belongs to.

Then the pair of X-directional nuts 19, and the Z-directional nut 21 are guided accurately in the same direction respectively by the X-directional screw rod 18 and the Z-directional screw rod 20 to position the robot hand 14 at the required row on the coupling board 1.

When the robot hand 14 is positioned at the required row, the motor in the Z-directional nut 21 is actuated to move the arm portion 16 in the direction of the required rows.

Since the spaces between the respective rows and their adjacent one have been cleared of any obstacle, the move of the robot hand 14 is never hindered by the other second optical fibers 6. In this operation, the robot hand 14 is moved forward over the top surface of the coupling board 1 along the required row and brings the hand portion 15 near to the connector 8 of the required second optical fiber 6A to be switched.

When the hand portion 15 is brought near to the required connector 8 to be switched, the hand portion 15 holds the connector 8 of the required second optical fiber 6A and is moved upward from the top surface of the coupling board 1 to release the lock of the connectors.

At this time the hand portion 15 can hold and smoothly pull out the connector 8 of the required second optical fiber 6A because the surface of the required second optical fiber 6A and that of its connector 8 are formed so as to define a smoothly continuous surface of a small frictional coefficient without any step when both are assembled.

When the lock of the connectors is thus released, the motor in the Z-directional nut 21 is again actuated to return the arm portion 16 to its original position along the required row.

When the arm portion 16 arrives at its original position, the X-directional screw rod 18 and the Z-directional screw rod 20 are again rotated so that the robot handle 14 is moved toward a required row a required first optical fiber 3 belongs to.

Then the pair of X-directional nuts 19 and the Z-directional nut 21 are guided accurately in the same direction respectively by the pair of X-directional nuts 19 and the Z-directional nut 21, and the robot handle 14 is positioned on the required row on the coupling board 1.

When the robot hand 14 is positioned at the required row on the coupling board 1, the motor in the Z-directional nut 21 is again actuated to move the arm portion 16 forward in the direction of the rows of the second optical fibers 6.

Since the spaces between the respective rows and its adjacent one have been cleared of any obstacle as described above, the move of the robot hand 14 is never hindered by the second optical fibers 6. In this operation, the robot hand 14 is moved forward over the top surface of the coupling board 1 and brings the hand portion 15 near to the connector adaptor of the required first optical fiber 3 to receive the required second optical fiber 6A.

When the hand portion 15 is brought near to the required connector adaptor 2 to receive the required second optical fiber 6A, the hand portion 15 connects and locks the connector 8 of the required second optical fiber 6A to the connector adaptor 2 of the required first optical fiber 3, and a switching operation is completed.

In such arrangement, the optical fiber length adjusting unit 9 handles surplus portions of the second optical fibers for the prevention of the entanglement of the second optical fibers 6 on the coupling board 1, and the partitioning rods 12 secure the spaces on the top surface of the coupling board 1 for the robot hand 14 to smoothly intrude into.

As results, it can be prevented that the second optical fibers 6 gather on the top surface of the coupling board 1 to adversely much lower the coupling operation of the optical fibers and to cause frequent coupling errors.

Furthermore, the disadvantage that when one slide terminal is switched to another slide terminal, the congestion of the optical fibers is always a serious problem can be prevented.

Furthermore, since large spaces are not necessary for coupling the optical fibers on the top surface of the coupling board 1, the problem of unpreferable large-sizes of the device as a whole can be prevented.

In this embodiment, the partition rods 12 have a bracket sign shape, but their shape is not limited to the shape and may have plate shapes or other shapes.

Then a second invention of this application will be explained by means of an embodiment shown in FIGS. 2(a), (b) and (c), and FIG. 3. Common elements have common reference numerals not to repeat their explanation.

Figure 3:
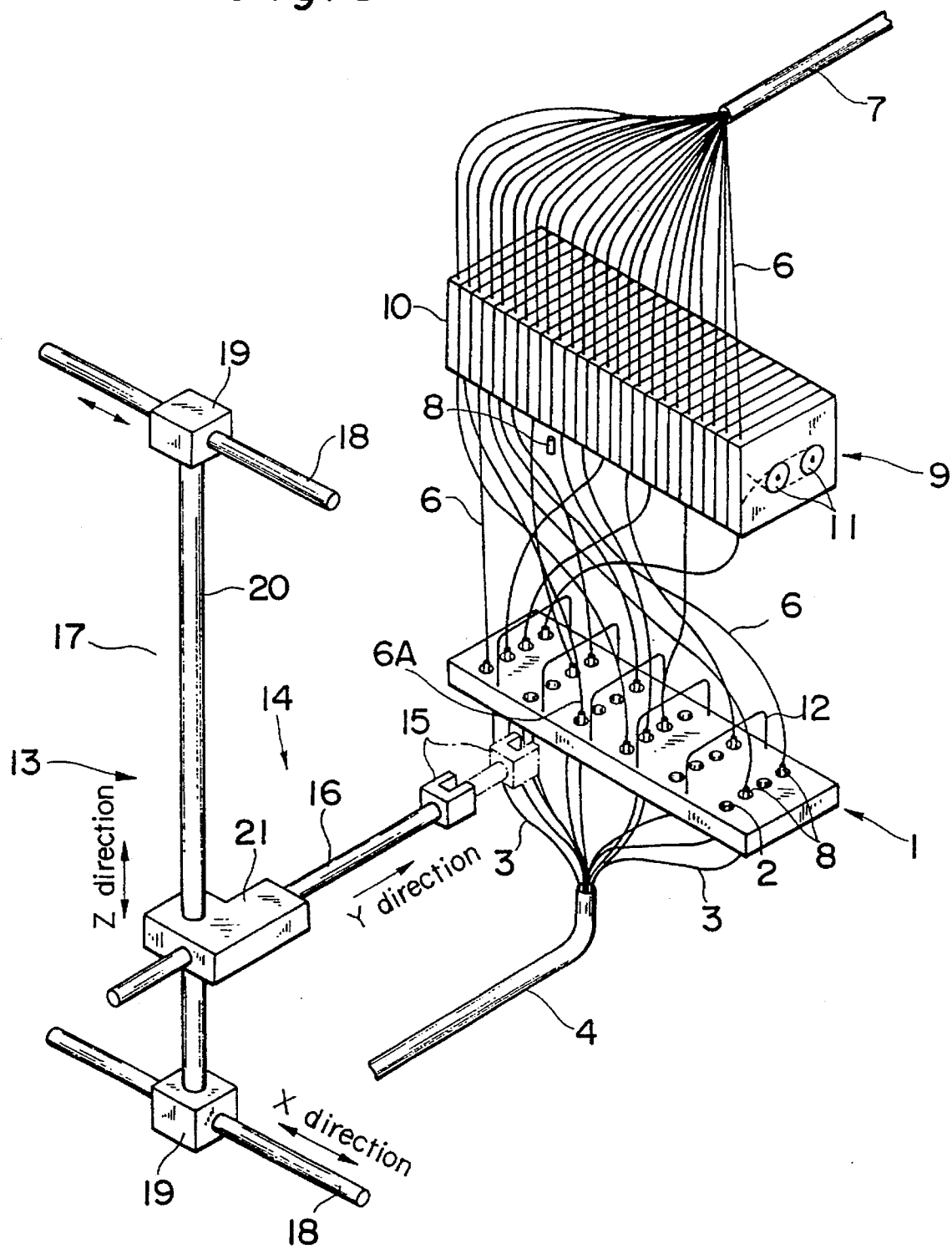
FIG. 3 is a general perspective view explaining the embodiment of FIGS. 2A–2C.

The optical fiber switching method according to the second invention of this application is conducted in the same device, as shown in FIG. 3, as the device according to the first invention comprising the coupling board 1, the optical fiber length adjusting unit 9, the partition rods 12, and the robot mechanism, but is different from the method conducted in the device according to the first invention in the operation of switching the optical fibers.

Then the optical fiber switching method according to the second invention of this application will be explained. First, a pair of reels 11 accommodated in the optical fiber length adjusting unit 9 is forcedly rotated to take up a required second optical fiber 6A in a direction substantially perpendicular to the top surface of the coupling board 1, so that the lock between a first optical fiber 3 and the required second optical fiber 6A which are optically coupled with each other is forcedly released (see FIG. 2(a)).

Figure 2C:
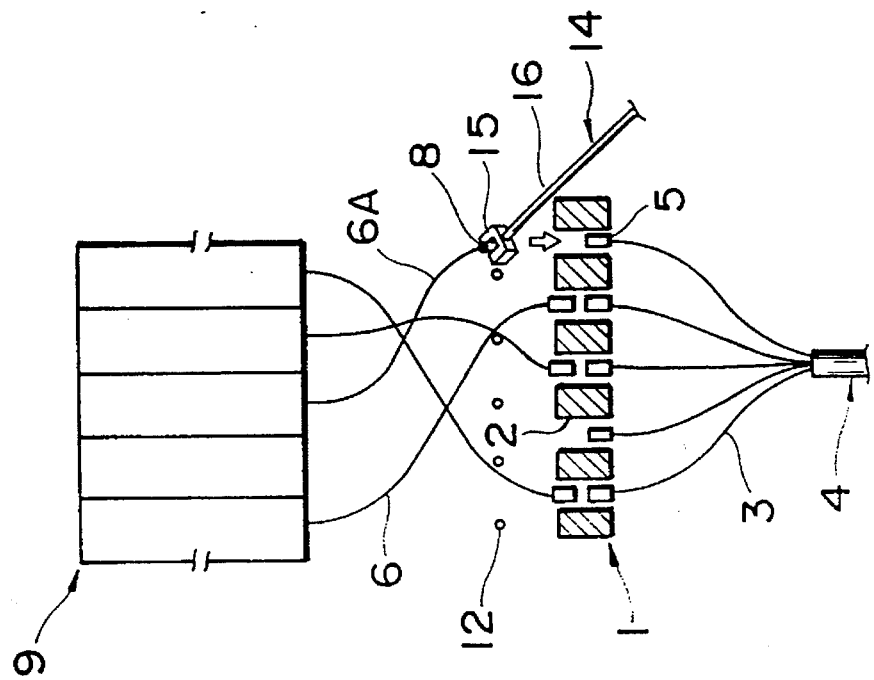
FIGS. 2A, 2B, and 2C are views showing the steps of the optical fiber switching method according to an embodiment of a second invention of this application.
Figure 2B:
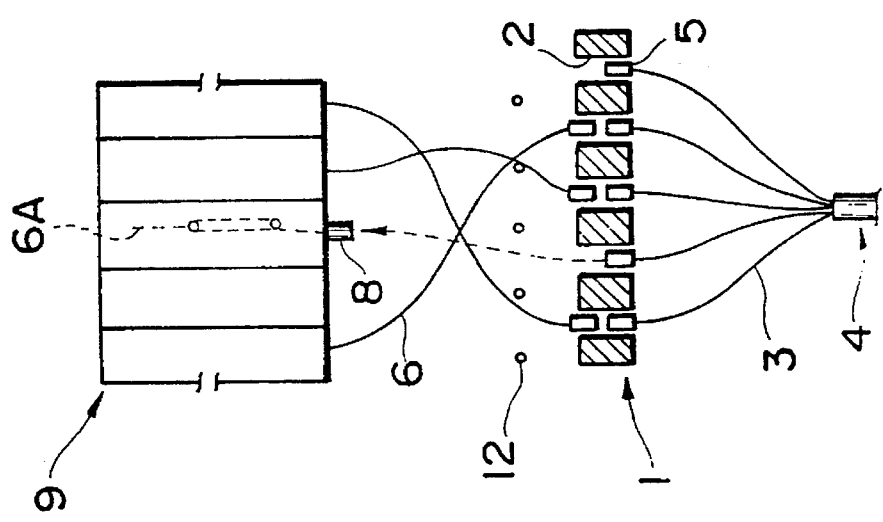
Figure 2A:
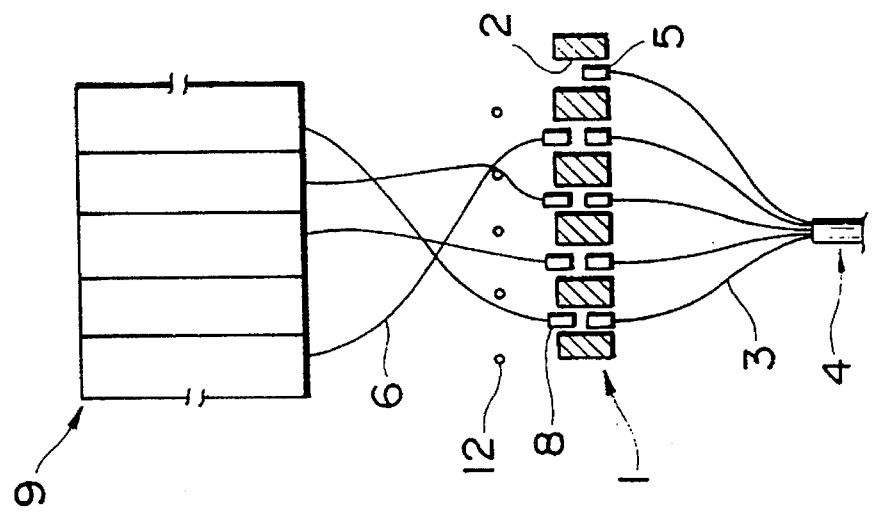

The required second optical fiber 6A released from the lock between the connectors is taken up in the optical fiber length adjusting unit 9 to position the connection 8 associated with the required second optical fiber 6A pendently on the underside of the optical fiber length adjusting unit 9 (see FIG. 2(*b*)).

At this time, because of the partition rods 12 on the coupling board 1, the required optical fiber 6A can be taken up into the optical fiber length adjusting unit 9 without gathering with or entangling with the other second optical fibers 6.

Subsequently to locate the robot hand 14 at a required position, the X-directional screw rod 18 and the Z-directional screw rod 20 are respectively rotated. When the robot hand 14 is located at the required position, the motor in the Z-directional nut 21 is rotated to move forward along the taken up second optical fiber 6A.

The robot hand 14 intrudes horizontally into a required row in a direction perpendicular to the required row, and in addition the required second optical fiber 6A is fed out of its associated one of exits (not shown) formed in one row in the underside of the optical fiber length adjusting unit 9. so that the robot hand 14 can easily arrive at the required optical fiber 6A without colliding with the other second optical fibers 6.

When the robot hand 14 holds the required second optical fiber 6A, as the arm portion 16 is returning, the robot hand 14 returns in the Y direction, pulling the required second optical fiber 6A to return to its original position.

When the arm portion 16 arrives at its original position, the X-directional screw rod 18 and the Z-directional screw rod 20 are again rotated to move the robot hand 14 toward a required row a required first optical fiber 3 belongs to.

Then the pair of X-directional nuts 19 and the Z-directional nut 21 are guided accurately in the same direction respectively by the X-directional screw rod 18 and the Z-directional screw rod 20 to position the robot hand 14 at the required row on the coupling board 1.

When the robot hand 14 is positioned at the required row on the coupling board 1, the motor in the Z-directional nut is again actuated to move the arm potion 16 forward in the direction of the rows of the second optical fibers 6.

Since the spaces between the respective rows and their adjacent ones has been cleared of any obstacle, the move of the robot hand 14 is never blocked. In this operation, the robot hand 14 is moved forward over the top surface of the coupling board 1 in the direction of the rows of the second optical fibers 6 to bring the hand portion 15 near to the connector adaptor 2 associated with the required first optical fiber 3 for the required second optical fiber 6A to be switched to.

When the hand portion 15 is brought near to the connector adaptor 2 for the required second optical fiber 6A to be switched to, the hand portion 15 connects the connector 8 of the required second optical fiber 6A to the connector adaptor 2 holding the connector 5 of the required first optical fiber and lock both connectors, and the switching operation is completed (see FIG. 2(*c*)).

In the method according to this embodiment, the optical fiber length adjusting unit 9 adjusts lengths of the second optical fibers 6 to prevent the second optical fibers 6 from gathering on the coupling board 1, while in the switching operation, a required second optical fiber 6A is taken up to prevent the required second optical fiber 6A from entangling with the other optical fibers 6.

The partition rods 12 define and secure on the coupling board 1 the spaces for the robot hand 14 to smoothly intrude into.

Accordingly it can be prevented that the second optical fibers 6 gather on the top surface of the coupling board 1 to adversely much lower the coupling operation of the optical fibers and to cause frequent coupling errors.

A problem that a required second optical fiber 6A droops to entangle with the other second optical fibers 6 with a result that the switching operation is made very difficult can be solved.

The disadvantage that when one slide terminal is switched to another slide terminal, the congestion of the optical fibers is always a serious problem can be prevented.

Since large spaces are not necessary for coupling the optical fibers on the top surface of the coupling board 1, the problem of unpreferable large-sizes of the device as a whole can be prevented.

In this embodiment, the partition rods 12 are provided on the top surface of the coupling board 1, but the partition rods 12 may be omitted.

The connection of the first optical fibers held in the coupling board 1 with the second optical fibers 6 is not essentially by the connectors, and the same function and effects as produced by this embodiment can be produced by the ON/OFF mechanisms or others of known automatic lock means built in the coupling board 1.

An optical fiber switching device according to a third invention of this application will be explained by means of an embodiment shown in FIGS. 4 and 5. Common elements have common reference numerals not to repeat their explanation.

Figure 4:
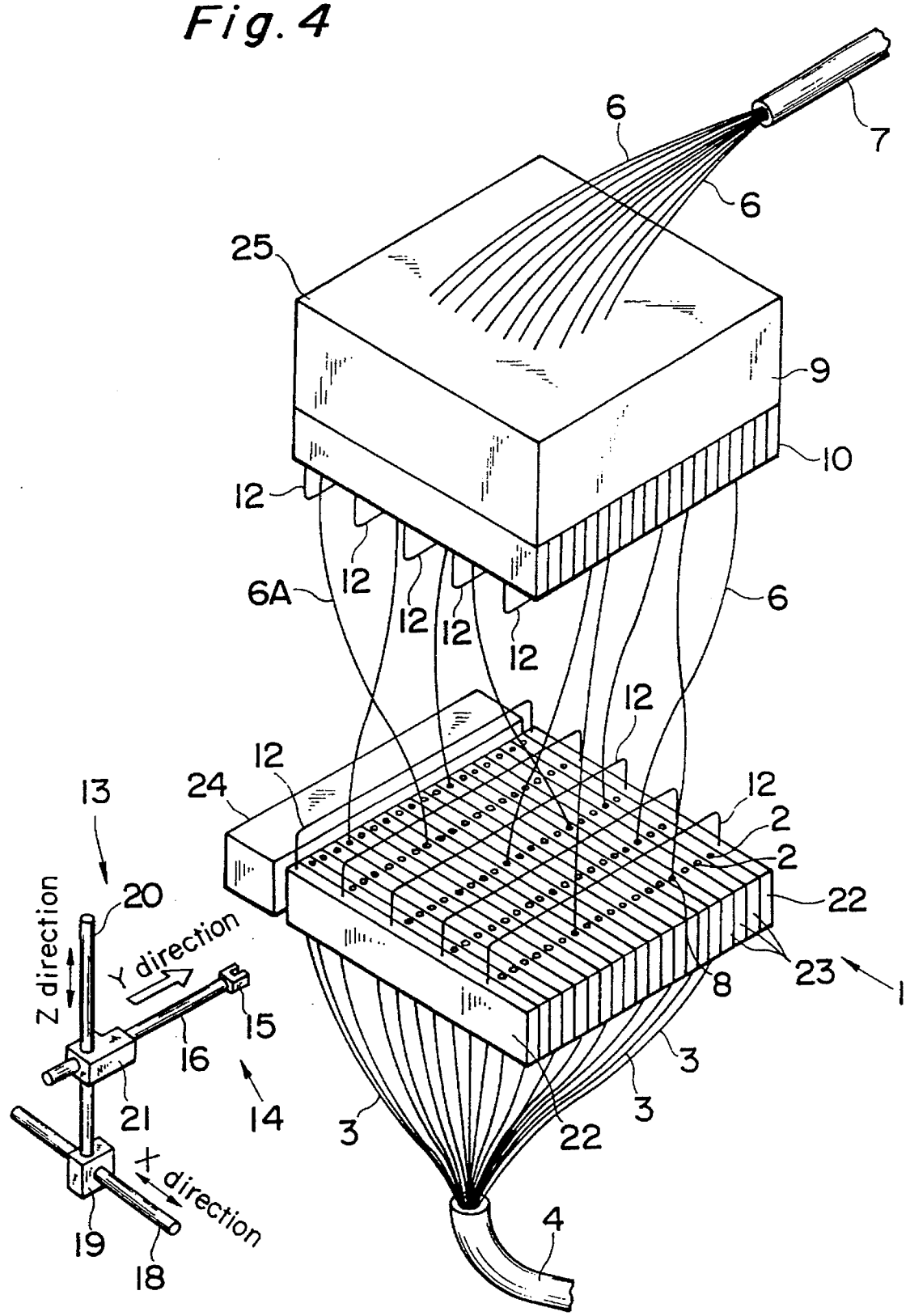
FIG. 4 is a general perspective view of an optical fiber switching device according to one embodiment of a third invention of this application.

As shown in FIG. 4, the optical fiber switching device according to the third invention of this application comprises a coupling board 1 in the form of a matrix board, an optical fiber length adjusting unit 9, partition rods 12, a robot mechanism 13 and a solenoid mechanism 24.

As shown in FIG. 4, the coupling board 1 comprises a pair of plates 22 opposed to each other with a space therebetween, a plurality of optical fiber holding units 23 disposed between the pair of plates 22 and each holding one row a plurality of first optical fibers 3 and a plurality of second optical fibers 6. The pair of plates 22 and the optical fiber holding units 23 constitute a block of generally rectangular section.

Each of the optical fiber holding units 23 has a plurality of connector adaptor holes (not shown) formed vertically therethrough at a certain interval, and connector adaptors 2 for the coupling of the second and the third optical fibers 3, 6 are fitted in the holes. Each of the first optical fibers 3 are received in the connector adaptors 2 from below.

The optical fiber holding units 23 are laid on each other in the direction (Y direction) perpendicular to the direction (X direction) of arrangement of the respective optical fiber holding units 23. The respective connector adaptors 2 are movable in the direction of arrangement of the respective optical fiber holding units 23.

Insertion holes for the partition rods 12 are formed in the top surface of the pair of plates 22 at a certain interval. Each partition rod 12 has both legs inserted respectively in the associated ones of the holes over the optical fiber holding units 23.

As shown in FIG. 4, each partition rod 12 has a bracket-sign shape and is inserted downward in the associated holes with the horizontal part thereof positioned very above the associated connector adaptors 2 in a row extending in the Y direction.

Accordingly the top surface of the coupling board 1 is divided in 5 spaces by the partition rods 12, and at least 5 spaces into each of which a robot hand 14 of a robot mechanism 13 can intrude from the slant left to the slant right as viewed in FIG. 4 are secured.

A solenoid mechanism 24 of a substantially rectangular parallelopiped for displacing a required optical fiber holding unit 23 by a required amount in the X direction is juxtaposed with one side of the coupling board 1.

Figure 5:
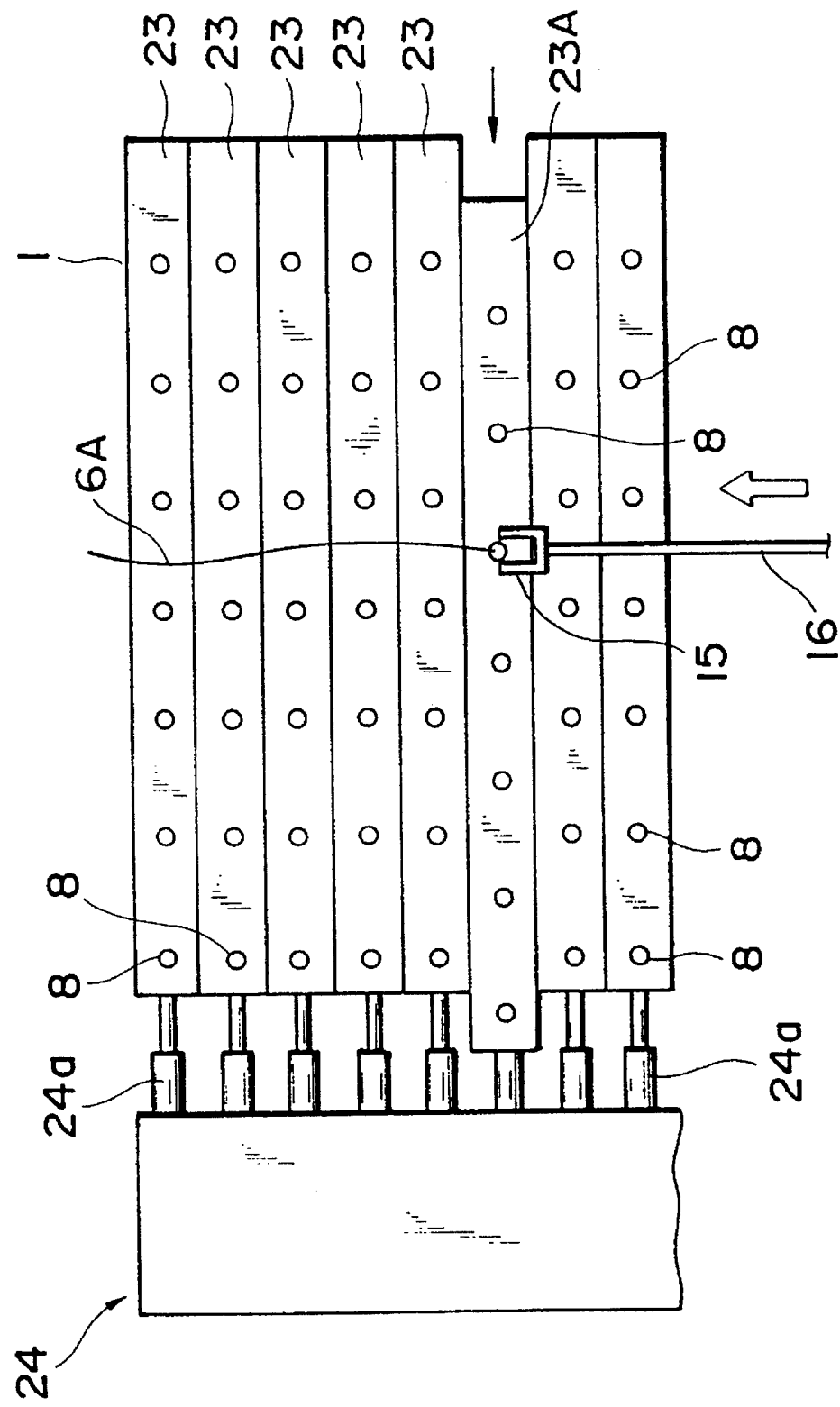
FIG. 5 is a plan view explaining an access of a robot hand.

As shown in FIG. 5, the solenoid mechanism 24 includes a plurality of reciprocable levers 24a provided on the side opposed to said one side of the coupling board 1 at positions corresponding to the optical fiber holding units 23. Each lever 24a is connected to each optical fiber holding unit 23.

As shown in FIG. 5, the solenoid mechanism 23 pulls, based on an applied voltage, the lever 24a of a selected one of the optical fiber holding units 23 to the left as viewed in FIG. 5, so that the connector adaptors 2 of the selected optical fiber holding unit 23 are displaced by a distance ½ the interval between the respective connector adaptors 2 and their adjacent ones in the same unit 23.

As shown in FIG. 5, this displacement brings only the connector adaptors 2 in the optical fiber holding units 23 displaced by the solenoid mechanism 24 into paths for the robot hand 14 to intrude into. Resultantly without turning a wrist portion, the robot hand 14 can easily make an access to and hold a required one of second optical fibers.

As shown in FIG. 4, the optical fiber length adjusting unit 9 comprises a plurality of optical fiber length adjusting blocks 10 horizontally laid on each other with the larger sides upright, a single storage 25 mounted on the top surfaces of the optical fiber length adjusting blocks 10. The optical fiber length adjusting unit 9 has a substantially rectangular parallelopiped and is mounted horizontally very above the coupling board 1.

Each of the optical length adjusting blocks 10 has a pair of rotatable reels 11 urged separate from each other by, e.g., a spring (not shown). A part of the associated second optical fiber 6 is wound on each pair of reel.

The springs are given a spring constant which generates a Z-directional force smaller than a connection force of the connectors of the first and the second optical fibers 3, 6 for coupling the first and the second optical fibers, whereby the spring force can prevent the release of the connection between the connectors.

Insertion holes for the partition rods 12 are formed in both end portions of the underside of the optical fiber length adjusting unit 10 at a certain interval. Each partition rod 12 is inserted horizontally pendant in those of the insertion holes opposed to each other.

As described above, each partition rod 12 has a substantially bracket-sign shape and is suspended with the horizontal part thereof positioned lower and extended in the Y direction.

Accordingly the partition rods 12 divide the undersides of the optical fiber length adjusting blocks 10 in at least five spaces, so that the second optical fibers 6 never entangle with one another near the undersides of the optical fiber length adjusting blocks 10.

The storage 25 has a box-shape of rectangular cross-section and keeps drooped surplus portions of the second optical fibers 6.

When the second optical fibers 6 are drawn out, the optical fiber length adjusting unit 9 rotates the reels 11 to pay out downward necessary lengths of the second optical fibers 6, whereby surplus portions of the second optical fibers 6 are handled to prevent the entanglement of the second optical fibers 6 on the coupling board 1. The other parts are the same as in the first invention.

Next, the operation of the optical fiber switching device according to this embodiment will be explained.

In releasing the lock of a first optical fiber 3 and a required second optical fiber 6A which are optically coupled with each other, first the X-directional screw rod 18 and the Z-directional screw rod 20 are respectively rotated to move the robot hand 14 to a pace adjacent to a row the required second optical fiber 6A belongs to. The X-directional nut 19 and the Z-directional nut 2 are guided by the X-directional screw rod 18 and the Z-directional screw rod 20, which are on rotation, accurately in the same direction to position the robot hand 14 in a space adjacent to the required row on the coupling board 1.

When the robot hand 14 is positioned in the space adjacent to the required row on the coupling board, the motor housed in the Z-directional nut 21 is actuated to move forward the arm portion 16 in the direction of the required row the required second optical fiber 6A belongs to.

Since the spaces between the respective rows and their adjacent one have been cleared of any obstacle, the move of the robot hand 14 is never hindered by the other second optical fibers 6. In this operation, the robot hand 14 is moved forward over the top surface of the coupling board 1 along the required row and brings the hand portion 15 near to the connector 8 of the required second optical fiber 6A to be switched.

At this time, based on an applied voltage the solenoid mechanism 24 pulls to the left as viewed in FIG. 5 the lever 24a associated with the optical fiber holding unit 23 the required second optical fiber 6A belongs to, and the connector adaptors 2 of the optical fiber holding unit 23 are replaced by a distance ½ the interval between the respective connector adaptors 2 and their adjacent ones.

This displacement brings only the connector adaptors 2 of the optical fiber holding unit 23 in the paths for the robot hand 14 to intrude into. Resultantly the robot hand 14 can easily make access and hold the required second optical fiber 6A.

When the robot hand 14 is position near the connector 8 to be switched, the hand portion 15 holds the connector 8 of the required second optical fiber 6A and is moved upward in the Z direction from the top surface of the coupling board 1, and the lock of the connector is released.

Since the surfaces of the connector 8 and those of the second optical fibers 6 define a smooth continuous surface with a small friction coefficient and, in addition, without any step, the robot hand 14 can hold and pull out the connector 8 of the required second optical fiber 6A.

When the lock of the connectors is thus released, the motor in the Z-directional nut 21 is again actuated to return the arm portion 16 to its original position in the direction of the row of the required second optical fiber 6A.

Then, based on an applied voltage the solenoid mechanism 24 returns the lever 24a of the optical fiber holding unit 23 the required second optical fiber 6A belongs to the right as viewed in FIG. 5, so that the connector adaptors 2 of the optical fiber holding unit 23 is replaced by the ½ distance back to its original position.

When the arm portion 16 is positioned at its original position, the X-directional screw rod 18 and the Z-directional screw rod 20 are again rotated to move the robot hand 14 toward the row a required first optical fiber 3 belongs to.

Then the X-directional nut 19 and the Z-directional nut 21 are guided respectively by the X-directional screw rod 18 and the Z-directional screw rod 20 accurately in the same direction to position the robot hand 14 at the required row on the coupling board 1.

When the robot hand 14 is positioned at the required row on the coupling board 1, the motor in the Z-directional nut 21 is again actuated to move forward the arm portion 16 in the direction of the second optical fibers 6.

Since the spaces between the respective rows and their adjacent ones has been cleared of any obstacle as described above, the move of the robot hand 14 is never blocked. In this operation, the robot hand 14 is moved forward over the top surface of the coupling board 1 in the direction of the rows of the second optical fibers 6 to bring the hand portion 15 near to the connector adaptor 2 associated with the required first optical fiber 3 for the required second optical fiber 6A to be switched to.

At this time, based on an applied voltage the splenoid mechanism 24 pulls the lever 24a associated with the optical fiber holding unit 23 the required first optical fiber 3 belongs to the left as viewed in FIG. 5, so that the connector adaptors 2 of the optical fiber holding unit 23 are replaced by a distance ½ the interval between the respective connector adpators 2 and their adjacent ones.

This displacement brings only the connector adaptors 2 held on the optical fiber holding unit 23 into the paths of the robot hand 14. Resultantly the robot hand 14 can easily make access and hold the required second optical fiber 6A.

When the hand portion 15 approaches the connector adaptor 2 for the required second optical fiber 6A to be switched to, the hand portion 15 connects the connector 8 of the required second optical fiber 6A to the connector adaptor 2 of the required first optical fiber 3 for the lock of the connector, and the switching operation is completed.

Since in the above-described arrangement the partition rods 12 secure on the top surface of the coupling board the spaces for the robot hand 14 to smoothly intrude into, disadvantages that the second optical fibers 6 gather on the top surface of the coupling board 1 to much lower the operation of coupling the optical fibers or to cause frequent occurrences of coupling errors can be prevented.

Furthermore, the disadvantage that when one slide terminal is switched to another slide terminal, the congestion of the optical fibers is always a serious problem can be prevented.

Furthermore, since large spaces are not necessary for coupling the optical fibers on the top surface of the coupling board 1, the problem of unpreferable large-sizes of the device as a whole can be prevented.

Furthermore, since only a selected optical fiber holding unit 23 is displaced into the paths for the robot hand 14 to intrude into, the robot hand 14 can very easily hold a connector 8.

Furthermore, since the robot mechanism 13 can be made compact, it can be expected that the robot mechanism 13 can be small-sized. It can be realized by this compaction to make the coupling board 1 denser.

In this embodiment the partition rods 12 are used, but instead plate members or others may be used. The slide means is not necessarily the solenoid mechanism 24 and can be, e.g., an assembly of a rack and pinion, a motor, etc.

The optical fiber holding units 23 may be arranged to be pushed out still with the same functional effect as in this embodiment achieved.

Subsequently an optical fiber switching device according to a fourth invention of this application will be explained in good detail by means of an embodiment shown in FIGS. 6 to 8.

Figure 8:
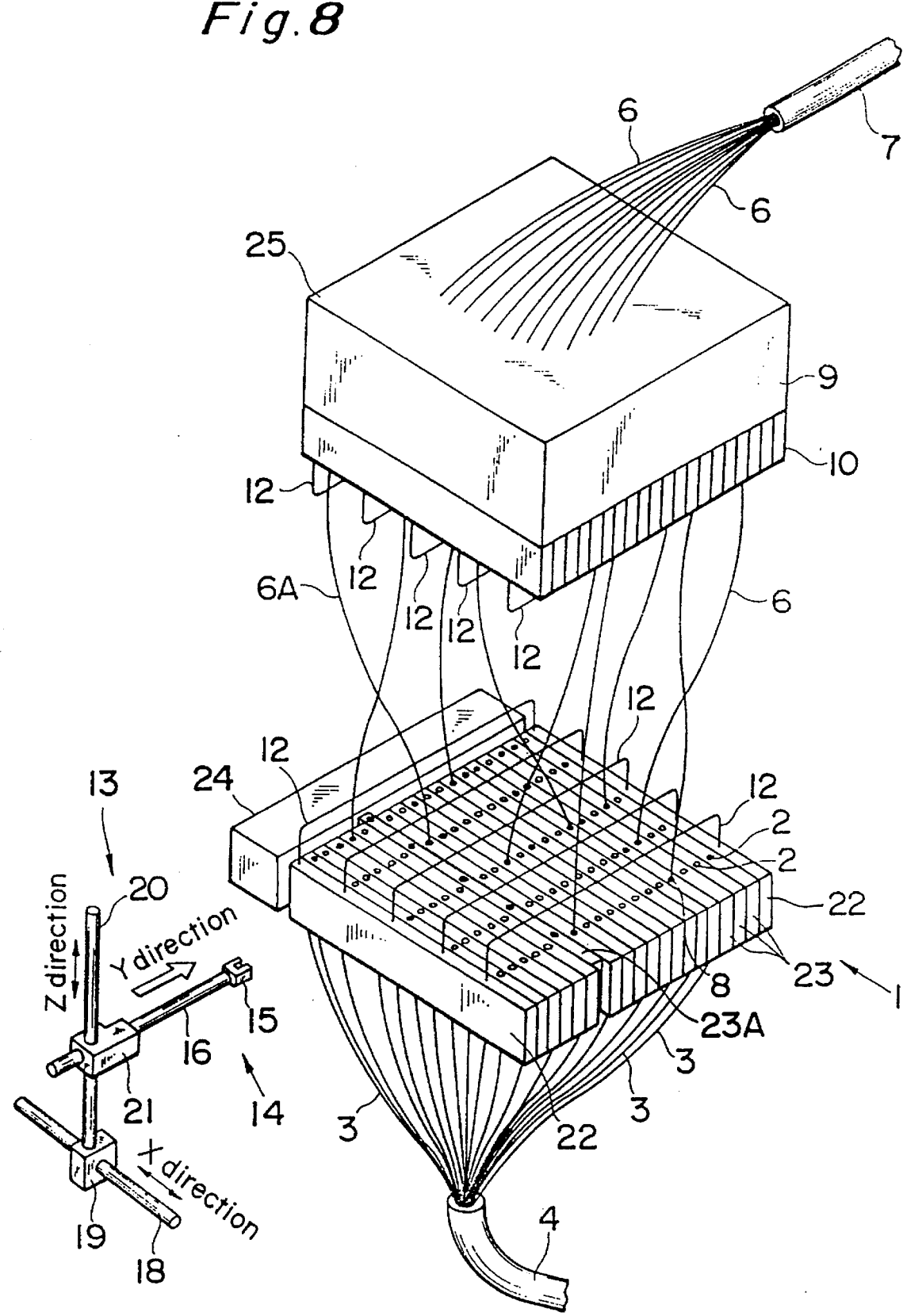
FIG. 8 is a general perspective view of an embodiment of the optical fiber switching device according to the fourth invention.

The optical fiber switching device according to the fourth invention comprises, as shown in FIG. 8, a coupling board 1 in the form of a matrix board, an optical fiber length adjusting unit 9, partition rods 12, a robot mechanism 13, and a solenoid mechanism 24.

As shown in FIG. 8, the coupling board 1 comprises a pair of plates 22 opposed to each other with a space therebetween, a plurality of optical fiber holding units 23 disposed between the pair of plates 22 and each holding in one row a plurality of first optical fibers 3 and a plurality of second optical fibers 6. The pair of plates 22 and the optical fiber holding units 23 constitute a block of generally rectangular section.

Figure 6:
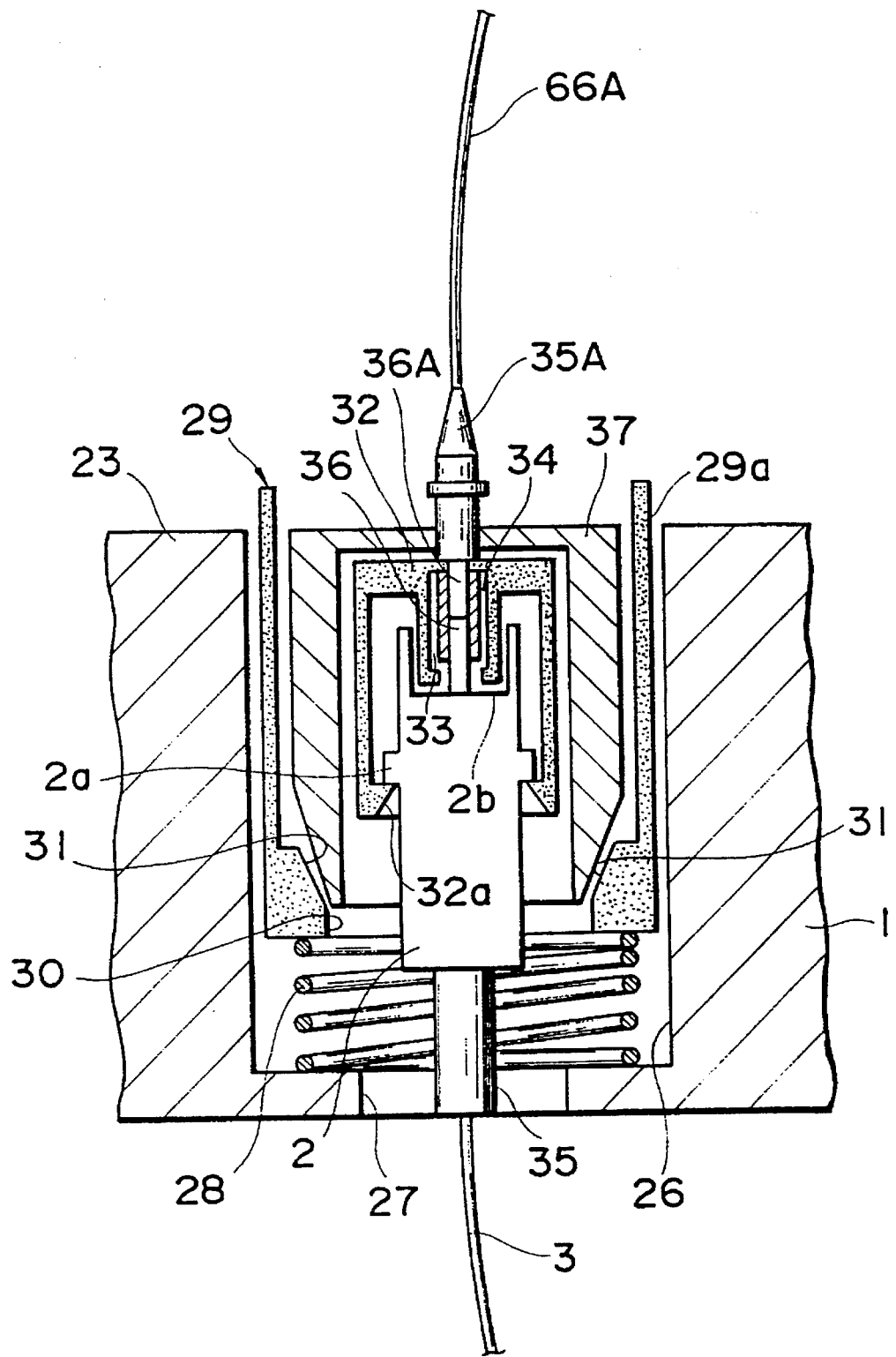
FIG. 6 is a vertical sectional view of a major part of an optical fiber switching device according to a fourth invention of this application.

As shown in FIG. 6, each of the optical fiber holding units 23 has a plurality of connector adaptor holes (grooves) 26 formed vertically therein at a certain interval, and a smaller-diameter optical fiber insertion hole 27 is formed through the bottom portion of the connector adaptor 26.

On the bottom of the connector adaptor hole 26 there is provided a compression coil spring 28, and a chuck releasing ring 29 (release button) is provided on the compression coil spring 28 and in the connector adaptor hole 26.

As shown in FIG. 6, the chuck releasing ring 29 has a cylindrical shape having an open top and an open bottom, and has a circumferential step 30 bulged toward the center from a lower part of the inside circumferential surface. On the entire surface of the step 30 there is formed a slant surface 31 defining a hole having a downwardly reduced diameter.

As shown in FIG. 6, the chuck release spring 29 is urged by the compression coil spring 28 with the top end 29a exposed from the top surface of the optical fiber holding unit 23. The chuck release ring 29 accommodates a connector adaptor 2 vertical.

As shown in FIG. 6, each connector adaptor 2 has a cylindrical shape, and a projection 2a is formed on the entire central part of the outside circumferential surface of the connector adaptor 2. The connector adaptor 2 has a concavity 2b formed in the top in which is inserted a sleeve holder 32 from above.

As shown in FIG. 6, the sleeve holder 32 has a cylindrical shape of substantially downward-bracket sign shaped section, and is supported by the associated optical fiber holding unit 23 by the part which is positioned perpendicular to the drawing sheet so as to be securely positioned with respect to the coupling board 1.

On the entire periphery of the bottom of the sleeve holder 32 there is provided a flexible pawl 32a directed toward the center. This flexible pawl 23a engages with the projection 2a of the associated connector adaptor 2.

At the center of the inside of the top surface of each sleeve holder 32 there is formed a cylindrical housing 33 of substantially downward-bracket sign section. This housing 33 accommodates a substantially cylindrical slit sleeve 34. This slit sleeve 34 holds a first optical fiber 3 and a second optical fiber coupled with each other.

Thus, when a connector adaptor 2 is inserted from below into the lower opening of each sleeve holder 32, the flexible pawl 32a is gradually expanded, and when the connector adaptor 32 is further advanced, the flexible pawl 32a is brought into engagement with the projection 2a, and the connector adaptor 2 is securely inserted in the sleeve holder 32.

One end of the first optical fiber 3 is inserted in a ferrule 35 and further in a zirconia ferrule 36. This zirconia ferrule 36 is passed through the optical fiber insertion hole 27 of the associated connector adaptor 2 and through the compression coil spring 28 thereof, whereby the first optical fiber 3 is removably inserted in the associated connector adaptor.

The zirconia ferrule 36 is projected upward from the connector adaptor 2 into the slit sleeve 34.

The zirconia ferrule is connected and disconnected by the action of a force in the direction of an optical axis.

On the other hand, one end of the second optical fiber is inserted in a connector ferrule 35A and further in a zirconia ferrule 36A. This zirconia ferrule 36A is passed through the insertion hole of a ferrule chuck 37 which will be described later, and through the center of the sleeve holder 32 into the slit sleeve 34 to be connected with the zirconia ferrule to the first optical fiber 36 in the slit sleeve 34.

This zirconia ferrule 36A is also connected and disconnected by the action of a force in the direction of an optical axis.

Figure 7:
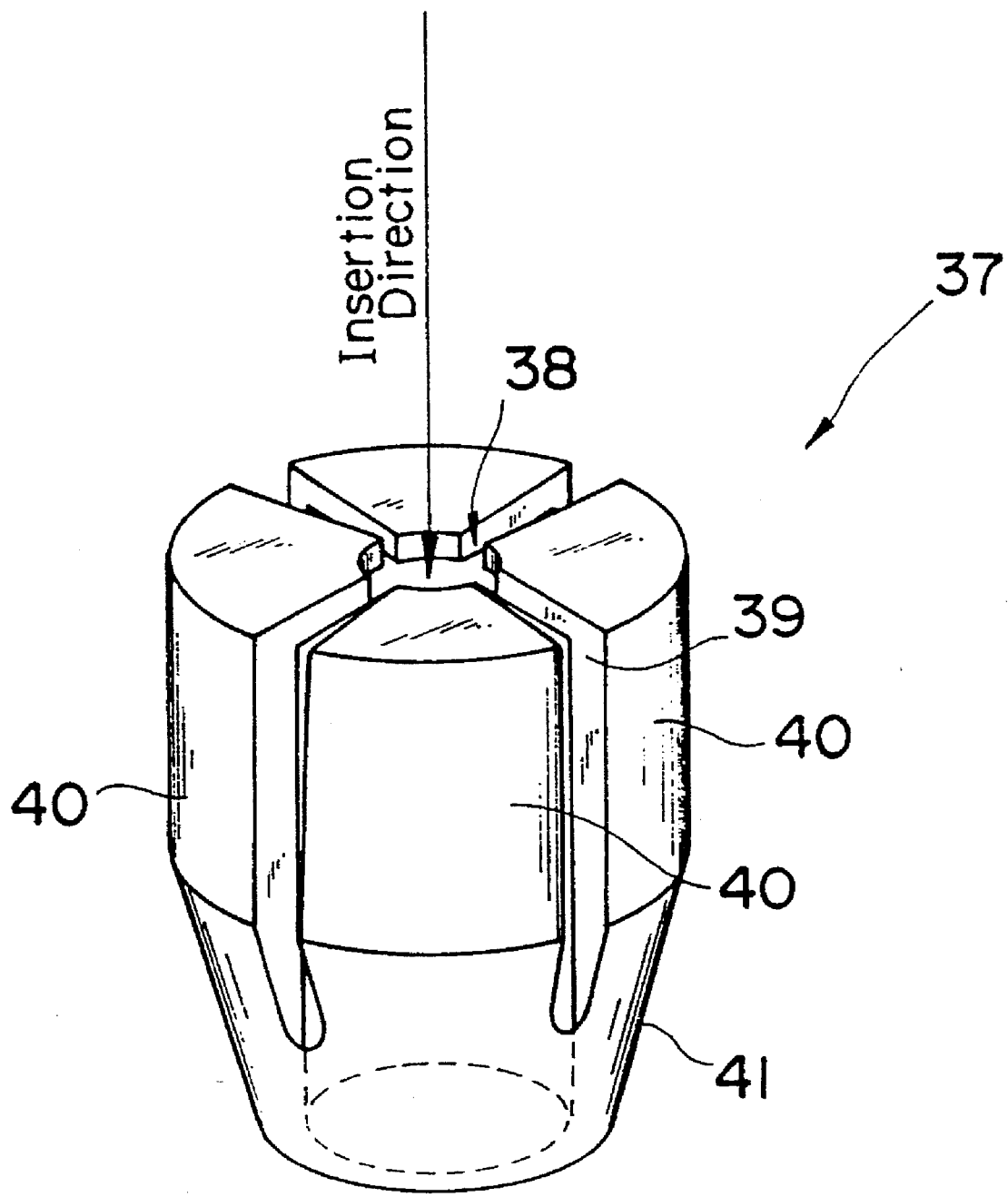
FIG. 7 is a perspective view of an appearance of a ferrule chuck used in the optical fiber switching device according to the fourth invention.

As shown in FIG. 7, the ferrule chuck 37 is made of a flexible member and has a substantially cylindrical shape having an open bottom. The ferrule chuck 37 is inserted in the chuck release spring 29 and accommodates the sleeve holder 32.

As shown in FIG. 7, the ferrule chuck 37 has an insertion hole 38 vertically formed through the center. The insertion hole 38 has a smaller diameter than the outer diameter of the connector ferrule 35A. A plurality of grooves 39 are formed in the side wall of the ferrule chuck 37 at a 90° interval around the insertion hole 38.

The grooves 39 quarter the side wall 40 of the ferrule chuck 37. the inside surface of the quartered side wall 40 serves to retain and reduce a diameter of the insertion hole 39.

The ferrule chuck 37 has an outer diameter of the lower part thereof gradually downwardly decreased in a substantially conical slant portion 41. This slant portion 41 is laid on the slant surface 31 of the chuck release ring 29 at the same angle.

When the slant surface 31 of the chuck release ring 29 is pressed against the slant portion 41 of the ferrule chuck 37, a connection force radially inwardly acts on the slant surface 40 of the ferrule chuck 37, and the inside circumferential wall of the quartered side wall 40 of the ferrule chick 37 reduces a diameter of the insertion hall 38, and the second optical fiber 6 inserted in the insertion hole 38 can be securely held.

When the hand portion 15 of the robot mechanism 13 lowers the upper end 29a of the chuck release ring 29, and the compression coil spring 28 is compressed, the chuck release ring 29 is lowered, leaving the slant surface 31 from the slant portion 41 of the ferrule chuck 37. Then the force which has been acting radially inwardly on the side wall 40 of the ferrule chuck 37 is removed or weakened, letting the ferrule chuck 37 back to its original configuration. And the required second optical fiber fastening of the ferrule chuck 37 is released.

As shown in FIG. 8, the optical fiber length adjusting unit 9 comprises a plurality of optical fiber length adjusting blocks laid on each other in the horizontal direction with the larger surfaces upright, and a single storage 25 mounted on the top surface of the optical fiber length adjusting blocks 10, and has a substantially rectangular parallelopiped and is positioned horizontally substantially very above the coupling board 1.

Each of the optical fiber length adjusting blocks 10 accommodates a pair of rotatable reels 11 urged by a spring (not shown) to space from each other. A part of a second optical fiber 6 is wound on the pair of reels 11.

The spring is given a spring constant smaller than a connection force between the first optical fiber 3 and the second optical fiber 6 which (the force) generates a force in the Z direction for the prevention of the release of the connection of the connectors.

Insertion holes 12 for the partition rods 12 are formed at a certain interval in opposed ends of the underside of the optical fiber length adjusting unit 9, and each partition rod is inserted horizontal in opposed ones of the insertion holes.

Each partition rod has a bracket sign-shape as described above and is suspended in the Y direction with the horizontal part positioned lower.

Thus the partition rods 12 divide the undersides of the optical fiber length adjusting units 9 in at least 5 spaces so as to prevent the entanglement of the second optical fibers 6 near the undersides of the optical fiber length adjusting blocks 10.

The storage 25 is in the shape of a box of substantially rectangular cross-section, and stores drooped surplus portions of the second optical fibers 6.

The optical fiber length adjusting unit 9, when a second optical fiber 6 is drawn out, rotates the reels 11 to pay out downward a necessary length of the second optical fiber 6, so that a surplus portion of the second optical fiber 6 is handled for the prevention of the entanglement of the second optical fibers on the coupling board 1. This invention is the same in the other points as the above-described third invention.

Next, the operation of the optical fiber switching device according to this embodiment will be explained.

When a first optical fiber and a required second optical fiber 6A which are optically coupled to each other are uncoupled, the X-directional screw rod 18 and the Z-directional screw rod 20 are respectively rotated to move the robot hand 14 toward the space adjacent to the row the required second optical fiber belongs to.

Then the X-directional nut 19 and the Z-direction nut 21 are guided accurately in the same direction by the X-directional screw rod 18 and the Z-directional rod 20 on rotation to position the robot hand 14 in the space on the coupling board 1 adjacent to the required row.

When the robot hand 14 is positioned in the space of the coupling board 1 adjacent to the required row, the motor in the Z-directional nut 21 us actuated to move forward the arm portion 16 along the required row.

Since the spaces between the respective rows and their adjacent ones have been cleared of any obstacle, the move of the required second optical fiber 6A is never hindered by the other second optical fiber 6. In this operation, the robot hand 14 is moved forward over the top surface of the coupling board 1 along the required row near the hand portion 15 to the connector ferrule 35A of the required second optical fiber 6A to be switched.

At this time, based on an applied voltage the solenoids mechanism 24 pulls the lever 24a associated with the optical fiber holding unit 23 the required second optical fiber 6A belongs to the left as viewed in FIG. 8 to displace the connector adaptors 2 of the optical fiber holding unit 23 by a distance ½ the interval between the respective connector adaptors 2 and their adjacent ones.

This displacement brings only the connector adaptors 2 associated with the optical fiber holding unit 23 into the paths of the robot hand 14. Accordingly it is possible that the robot hand 14 make access and hold the required connector ferrule 35A without turning the wrist portion.

When the hand portion 15 is brought near to the connector ferrule 35A to be switched, the hand portion 15 lowers the top end 29a of the chuck releasing ring 29 surrounding the required second optical fiber 6A to compress the compression coil spring 28.

Then the chuck release ring 29 is lowered to leave the slant surface 31 from the slant portion 41 of the ferrule chuck 37. And a force which has been acting radially inwardly on the side wall 40 of the ferrule chuck 37 is removed or weakened to cause the ferrule chuck 37 to have its original shape, and the required optical fiber holding sate of the ferrule chuck 37 is released.

In this state the hand portion 15 holds the connector ferrule 35A of the required second optical fiber 6A and is moved upward in the Z direction from the top surface of the coupling board 1. And the lock of the connectors is released.

Since the surfaces of the connector ferrules and those of the second optical fibers 6 define smooth continuous surface with a small friction coefficient and without any step, the hand portion 15 can hold and smoothly pull out the connector ferrule 35A of the required second optical fiber 6A.

When the hand portion 15 thus leaves the top end 29a of the chuck release ring 29, on which the hand portion 15 has been abutting, the compression coil spring 28 which has been compressed restores its original condition.

Then the chuck release ring 29 rises to press the slant surface 31 thereof against the slant portion 41 of the ferrule chuck 37, and the removed or weakened force tries to act radially inwardly on the side wall 40 of the ferrule chuck 37.

But the connector ferrule 35A can be timingly pulled out of the ferrule chuck 37, because the configurations and the positions, etc. of the ferrule chucks 37 and of the connector ferrules 25 have been so designed that an inner diameter of the ferrule chucks 37 does not become smaller than an outer diameter of the connector ferrules 35 until the connector ferrule 35A is pulled out. Thus the connector ferrule 35A can be timingly pulled out of the ferrule chuck 37.

When the lock of the connectors is released, the motor in the Z-directional nut 21 is again actuated to return the arm portion 16 to its original position in the direction of the rows of the second optical fibers 6.

Then, based on an applied voltage the solenoid mechanism 24 return the lever 24a of the optical fiber holding unit 23 associated with the required second optical fiber 6A to the right as viewed in FIG. 8 to displace the optical fiber holding unit 23 by the distance ½ the interval between the respective connector adaptors 2 and their adjacent ones back to its original position.

When the arm portion 16 is positioned at its original position, X-directional screw rod 18 and the Z-directional screw rod 20 are again rotated to move the robot hand 14 toward the required row a required first optical fiber 3 belongs to.

Then the X-directional nut 19 and the Z-directional nut 21 are guided respectively by the X-directional screw rod 18 and the Z-directional screw rod 20 accurately in the same direction to position the robot hand 14 in the required row on the coupling board 1.

When the robot hand 14 is positioned in the required row on the coupling board 1, the motor in the Z-directional nut 21 is again actuated to move the arm portion 16 forward in the direction of the second optical fibers 6.

Since the spaces between the respective row and their adjacent ones have been cleared of any obstacle as described above, the move of the robot hand 14 is never blocked by the second optical fibers 6. In this operation the robot hand 14 is moved forward over the top surface of the coupling board 1 in the direction of the required row to bring the hand portion 15 near to the connector adaptor 2 of the required first optical fiber 3 for the required second optical fiber to be switched to.

At this time, based on an applied voltage the solenoids mechanism 24 pulls the optical fiber holding unit 23 the required optical fiber 3 belongs to the left as viewed in FIG. 8 displace the connector adaptors 2 of the optical fiber holding unit 23 by the distance ½ the interval between the respective connector adaptor and their adjacent ones.

This displacement bring only the connector adaptors of the optical fiber holding unit 23 into the paths of the robot hand 14, so that the robot hand 14 can easily make access and hold the ferrule chuck of the required first optical fiber 3.

When the hand portion 15 is brought near to the connector adaptor for the required second optical fiber 6A to be switched to, the hand portion 15 connects the connector ferrule 35A of the required optical fiber 6A to the ferrule chuck 37 of the required first optical fiber 3 to lock the connectors, and the switching operation is completed.

In the above-described arrangement, since the spaces for the robot hand 14 to intrude into can be secured by the partition rods on the top surface of the coupling board, disadvantages that the second optical fibers 6 gather on the top surface of the coupling board 1 to much lower the operation of coupling the optical fibers or to cause frequent occurrences of coupling errors can be prevented.

Furthermore, the disadvantage that when one slide terminal is switched to another slide terminal, the concentration of the optical fibers is always a serious problem can be prevented.

Furthermore, since large spaces are not necessary for coupling the optical fibers on the top surface of the coupling board 1, the problem of unpreferable large-sizes of the device as a whole can be prevented.

Furthermore, since only a selected optical fiber holding unit 23 is displaced into the paths for the robot hand 14 to intrude into, the robot hand 14 can very easily hold a connector 8.

Furthermore, since the robot mechanism 13 can be made compact, it can be expected that the robot mechanism 13 can be small-sized. It can be realized by this compaction to make the coupling board 1 denser.

Furthermore, a required optical fiber 6A holding state of a ferrule chuck 37 cannot be released until a force which has been acting radially inwardly on the side wall 40 of the ferrule chuck 37 is removed or weakened as the associated chuck release ring 29 is lowered, and the ferrule chuck 37 restores its original configuration.

Accordingly the disadvantage that the required second optical fiber 6A comes off the coupling board 1 due to a cause, disconnected from a first optical fiber 3 can be eliminated.

The above-described embodiments use the partition rods 12, but instead plate memebers may be used.

The slide means may not be provided essentially by the solenoids mechanism 24 but in place by a combination of a rack and pinion, a motor, etc.

The arrangement by which the optical fiber holding units 23 are pushed out can still the same functional effects as in this embodiment.

The inventions of this application cover other various modifications within the scope leaving the gist thereof. In the above-described embodiments, the ferrule chucks 37 are opened and closed by the robot hand 14, but instead a solenoid or the like is build in the coupling board 1 to open and close the ferrule chucks 37.

An optical fiber switching device according to a fifth invention of this application will be explained in good detail by means of an embodiment shown in FIGS. 9 to 11. In the explanation common elements have common reference numerals not to repeat their explanation.

Figure 9:
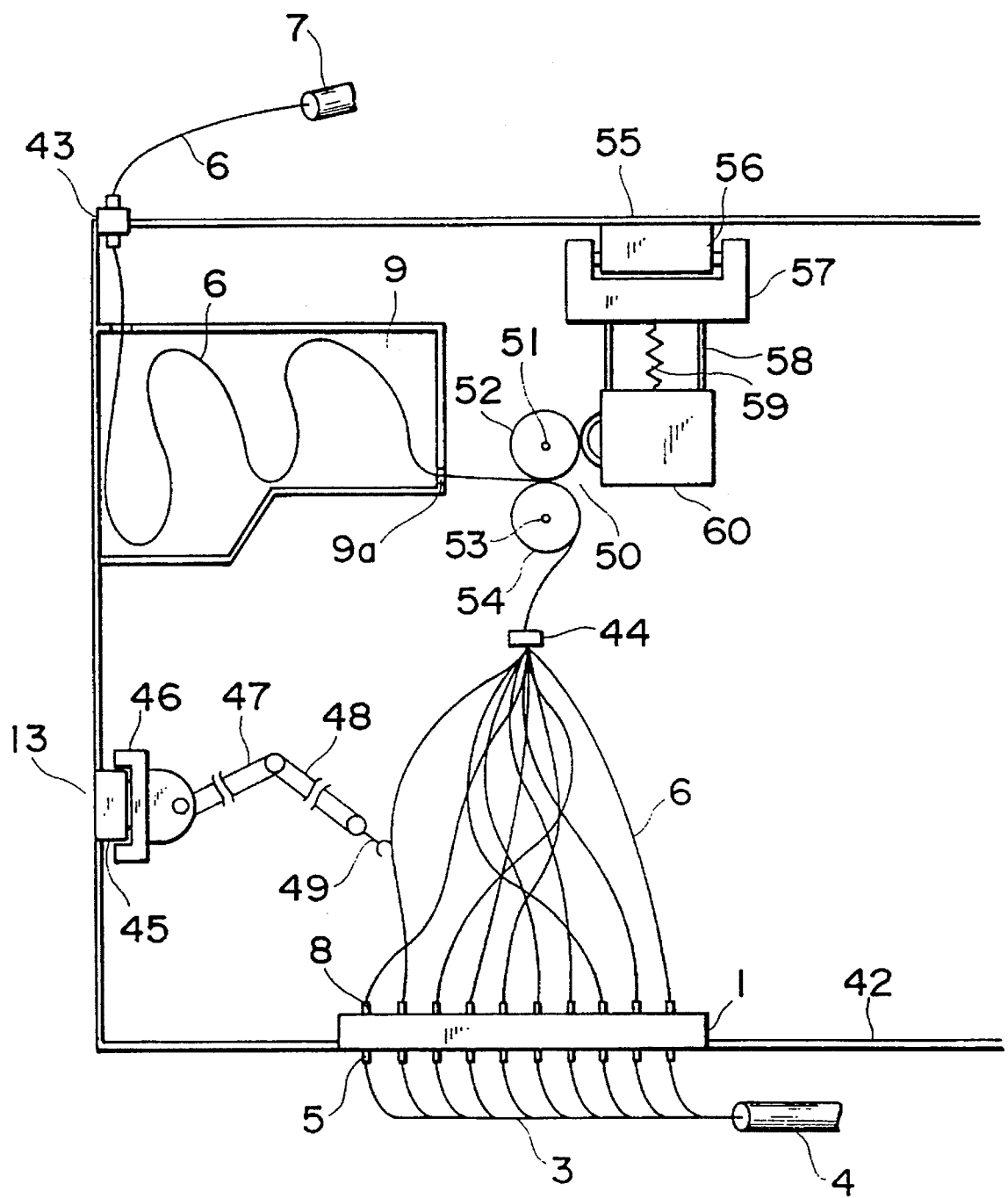
FIG. 9 is a general perspective view of an embodiment of an optical fiber switching device according to a fifth invention of this application.

As shown in FIG. 9, the optical fiber switching device according to the fifth invention of this application comprises a coupling board 1, first optical fibers 3, second optical fibers 6, optical fiber length adjusting units 9, a robot mechanism 31, rotary bodies 50, and a selective carrying mechanism 55.

As shown in FIG. 9, the coupling board 1 is in the form of a matrix board of rectangular cross-section and has a plurality of connector adaptor holes (not shown) formed vertically therein in a matrix of rows and columns.

The coupling board 1 includes connector adaptors for connection (not shown) fitted in the respective connector adaptor holes, and is laid on the inside bottom of an optical fiber coupling box 42 having a substantially box-like shape.

As shown in FIG. 9, a plurality of first optical fibers 3 are extended from a first optical cable 4 disposed outside and below the optical fiber coupling box 42. Ferrules on the ends of the first optical fibers 3 are inserted connectors 5 for connection, and the connectors 5 detachably inserted in the respective connector adaptors from the side of the underside of the coupling board 1.

On the other hand, a plurality of second optical fibers are extended from a second optical cable 7 disposed outside and above the optical fiber coupling box 42 into the optical fiber coupling box 42 through a plurality of connector adaptors 43.

Connectors 8 on the forward ends of the second optical fibers 6 are detachably inserted into and held by the connector adaptors in the coupling board 1 sequentially through the optical fiber length adjusting unit 9, the rotary body 50, and a positioning and converging unit 44 to be coupled opposed to the first optical fibers 3 through the connector adaptors in the coupling board 1.

The connector adaptors 43 are juxtaposed inwardly as viewed in FIG. 9 on an inside upper corner of the optical fiber coupling box 42 in a plural number corresponding to a number of the second optical fibers 6.

The positioning and converging unit 44 is disposed above the coupling board 1, and the second optical fibers 6 are passed vertically through the positioning and converging unit 44. The positioning and converging unit 44 functions to collect the second optical fibers 6 in a single bundle to position the second optical fibers 6 at a small distance above the coupling board 1.

As shown in FIG. 9, each optical fiber length adjusting unit 9 is defined in a substantially box-like shape by some partition plates at an upper part of the interior of the optical fiber coupling box 42. The optical fiber length adjusting units 9 are provided in a plural number corresponding to a number of the second optical fibers 6 and are juxtaposed inward as viewed in FIG. 9.

The optical fiber length adjusting units 9 has the function of taking in through the associated outlet ports 9a surplus portions of the associated second optical fibers introduced in the optical fiber coupling box 42.

As shown in FIG. 9, the robot mechanism 13 comprises a guide rail 45 directed inward as viewed in FIG. 9, a robot body 46 engaged with the guide rail slidably inward as viewed in FIG. 9, a first arm 47 connected to the robot body by a pin rotatably upward and downward, a second arm 48 connected to the forward end of the first arm by a pin rotatably upward and downward, and a fork hand 49 mounted on the forward end of the second arm 48 rotatably upward and downward for engage and holding a connector 8.

The robot mechanism 13 functions to select a required one 6A out of the second optical fibers 6 optically coupled with the first optical fibers 3, and detaching and attaching the required second optical fiber 6A for switching to a required first optical fiber.

In this embodiment the robot mechanism 13 has the fork hand 49 but may have a different type of hand.

Figure 10:
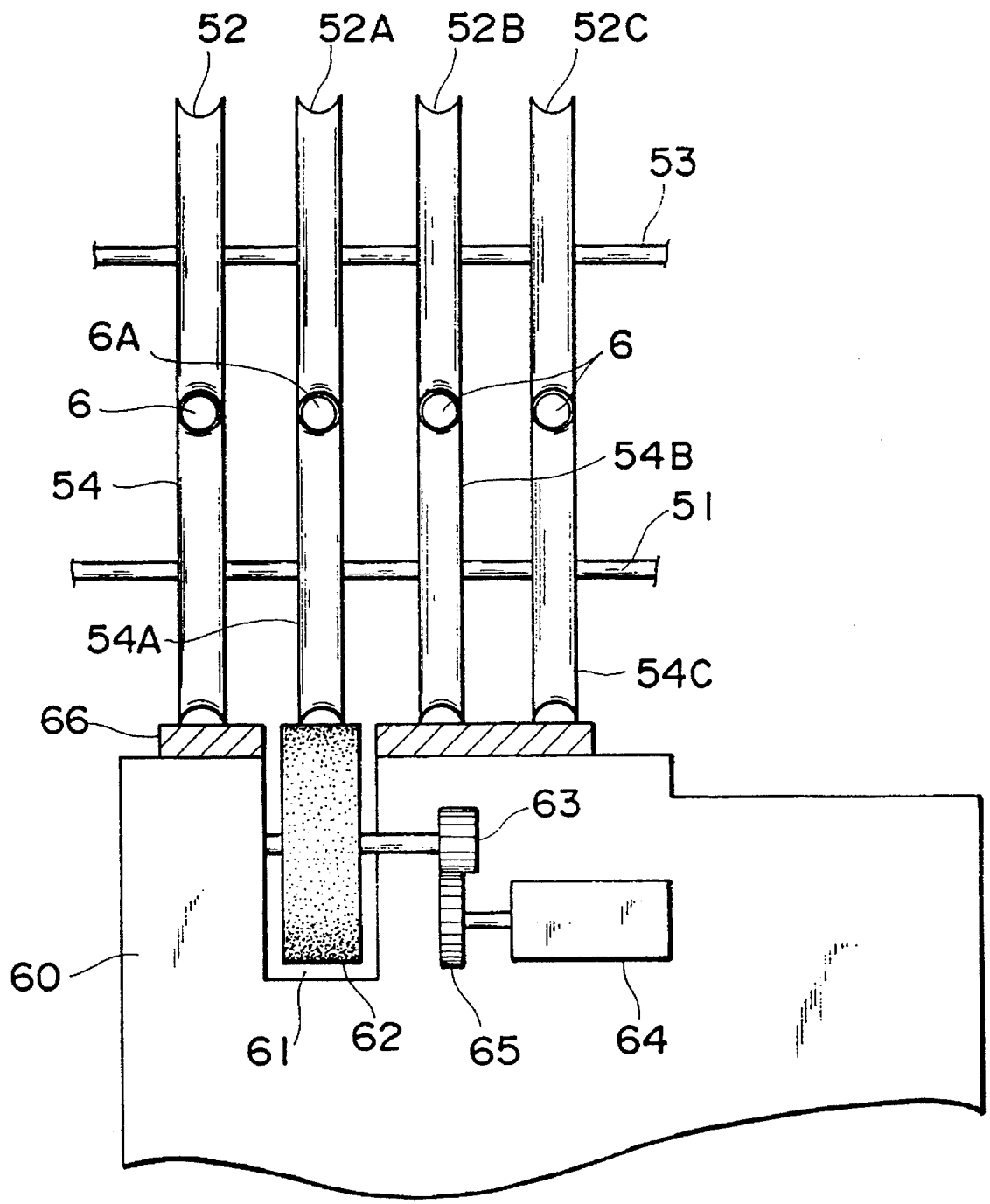
FIG. 10 is a sectional view of a major part of the embodiment of the fifth invention of FIG. 9.

As shown in FIG. 10, the rotary bodies 50 comprise drive pulleys (rotary grippers) 52, 52A, 52B. 52C rotatably mounted on a drive shaft 51 in a number corresponding to a number of the second optical fibers, a number of driven pulleys (rotary grippers) 54, 54A, 54B, 54C mounted rotatably on a driven shaft in a number corresponding to the number of the second optical fibers, and opposed respectively to the drive pulleys 52, 52A, 52B, 52C positioned very above the respective driven pulleys, and a neighboring spring (not shown) wound on the drive shaft 51 and the driven shaft 53 for normally neighboring the drive and the driven pulleys 42, 52A, 52B, 52C; 54, 54A, 54B, 54C respectively opposed to each other.

As shown in FIGS. 9 and 10, these rotary bodies 50 are disposed near the respective optical fiber length adjusting units 9 and functions to feed between the drive and the driven pulleys 52, 52A, 52B, 52C; 54, 54A, 54B, 54C the second optical fibers 6 extended through the outlet ports 9a of the optical fiber length adjusting units 9 at a certain arrangement pitch.

As shown in FIGS. 9 and 10, the above-described selective carrying mechanism 55 comprises a guide rail suspended from the ceiling of the optical fiber coupling box 42 at a position slantly above the drive pulleys 52, 52A, 52B, 52C, and a carrying mechanism body 57 engaged in the guide rail 56 slidably inward as viewed in FIG. 9.

From the carrying mechanism body 57 are suspended a plurality of guide rods 58. At the lower ends of the guide rods 58 there is provided a pendant body 60 which is normally urged downward movably upward and downward by the urging effect of a spring 59.

A part of the pendant opposing to the drive pulleys 52, 52A, 52B, 52C is recessed, as shown in FIG. 10, for a rubber roller accommodating portion 61 as shown in FIG. 10, and in the recess 61 there is rotatably mounted a rubber roller 62 on a shaft. The rubber roller 62 is slidably contacted with one of the drive pulleys (drive rotary bodies) 52,52A, 52B, 52C, and a gear 63 mounted on the end of the shaft of the rubber roller 62 is in mesh with a gear 65 of a motor 64 for driving the rubber roller 62.

As shown in FIG. 10, a brake pad (restraining part) of rubber or the like is adhered to a part of the pendant body 60 to be opposed to one of the drive pulleys 52, 52A, 52B, 52C, and when one of the drive pulleys 52, 52A, 52B, 52C is on rotation, the brake pad 66 is pressed against one of the other drive pulleys 52, 52A, 52B, 52C to restrain the rotation of the other neighboring pulleys.

Thus the selective carrying mechanism 55 has the function of, as shown in FIG. 10, selectively rotating only one of the drive pulleys and one of the driven pulleys gripping a required second optical fiber 6A selected by the robot mechanism 13 to carry to and store in the associated optical fiber length adjusting unit 9 a surplus portion of the required second optical fiber 6A.

Meanwhile the brake pad 66 functions to press and restrain the rotation of the other neighboring drive and driven pulleys.

In FIG. 10, for example, when the required second optical fiber 6A of the second optical fibers 6 is selected and switched, first the robot mechanism 13 is slid along the guide rail 45 from its original position to the position where the robot mechanism 13 is opposed to the required second optical fiber 6A.

Then the first arm 47 and the second arm 48 are extended on rotation toward the required second optical fiber 6A, and the fork hand 49 holds the connector 8 of the required second optical fiber 6A. Then the fork hand 49 is swung to the left and the right and pulls out the required second optical fiber 6A out of the connector adaptor.

Then when the disconnection of the required second optical fiber 6A is detected, the selective carrying mechanism 55 is slid along the guide rail 45 from its original position to a position where the required second optical fiber 6A is opposed to the drive pulley 52A which is to grip the required second optical fiber 6A in cooperation with the driven pulley 54A.

Then the rubber roller 62 is slidably pressed against the drive pulley 52A while the brake pad 66 is pressed against the other neighboring drive pulleys 52, 52B, 52C.

Then the motor for driving the rubber roller is driven to rotate the gear 65. The rotation of the gear 63 rotates the rubber roller 62. the rotation of the rubber roller 62 rotates the drive pulley 52A clockwise while driving the driven pulley 54A counter-clockwise.

At this time since the other drive pulleys 52, 52B, 52C neighboring the drive pulley 52A are pressed by the brake pad 66 as shown in FIG. 10, their rotation is restrained without failure.

Then the rotations of the drive pulley 52A and of the driven pulley 54A sends a surplus portion of the gripped second optical fiber 6A from the top surface of the coupling board 1 toward the associated optical fiber length adjusting unit 9 to be stored therein. Accordingly the surplus portion of the required second optical fiber 6A is prevented from entangling with the other second optical fibers 6.

Then the robot mechanism 13 is slid along the guide rail 45 to a position where the robot mechanism 13 is opposed to the connector adaptor of the required first optical adaptor.

Then the first arm 47 and the second arm 48 are extended on rotation to cause the fork hand 49 holding the connector 8 of the required second optical fiber 6A to connect the connector 8 to the connector adaptor of the required first optical fiber 3, and the connection switching operation is completed.

In the above-described arrangement, the robot mechanism 13 in place of an operator automatically switch a selected second optical fiber 6A. Resultantly the operation of connection switching is much improved, and operating costs are much lowered.

Much improvement of maintenance operations are expected. Since the brake pad 66 restrains without failure the rotation of those of the drive pulleys 52, 52B, 52C and those of the driven pulleys 54, 54B, 5C which are gripping the second optical fibers the robot mechanism has not selected, the second optical fibers which have not been selected are securely kept from damages.

Figure 11:
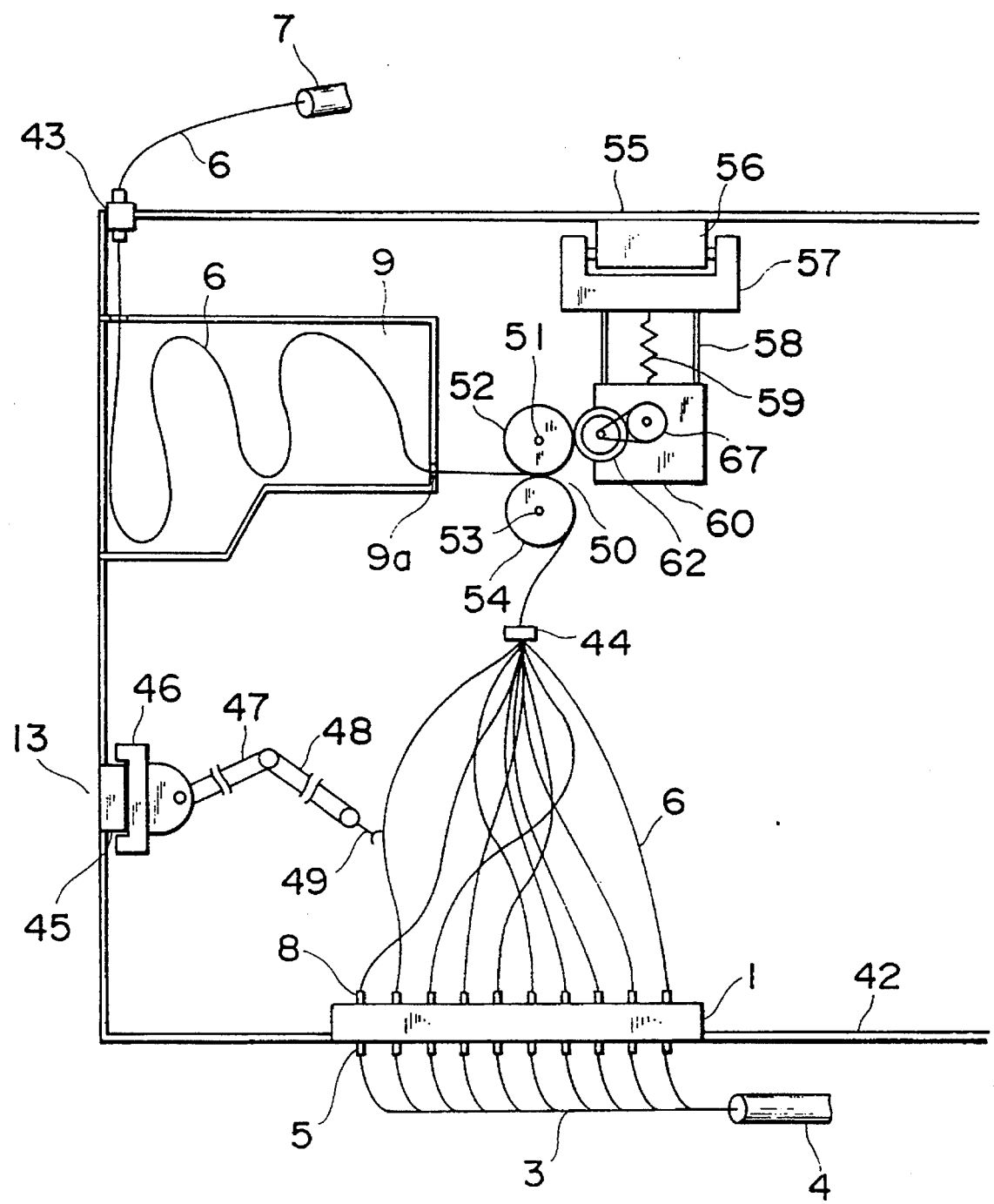
FIG. 11 is a general view of the optical fiber switching device according to another embodiment of the fifth invention.

In this embodiment, the rubber roller 62 is rotated by the mesh between the gears 63, 65, but as shown in FIG. 11, a timing belt 67 or the like may be used to rotate the rubber roller 62 still with the same functional effect achieved.

Finally an optical fiber switching device according to a sixth invention of this application will be explained in good detail by an embodiment shown in FIGS. 12 to 18. common elements have common reference numerals not to repeat their explanation.

Figure 12:
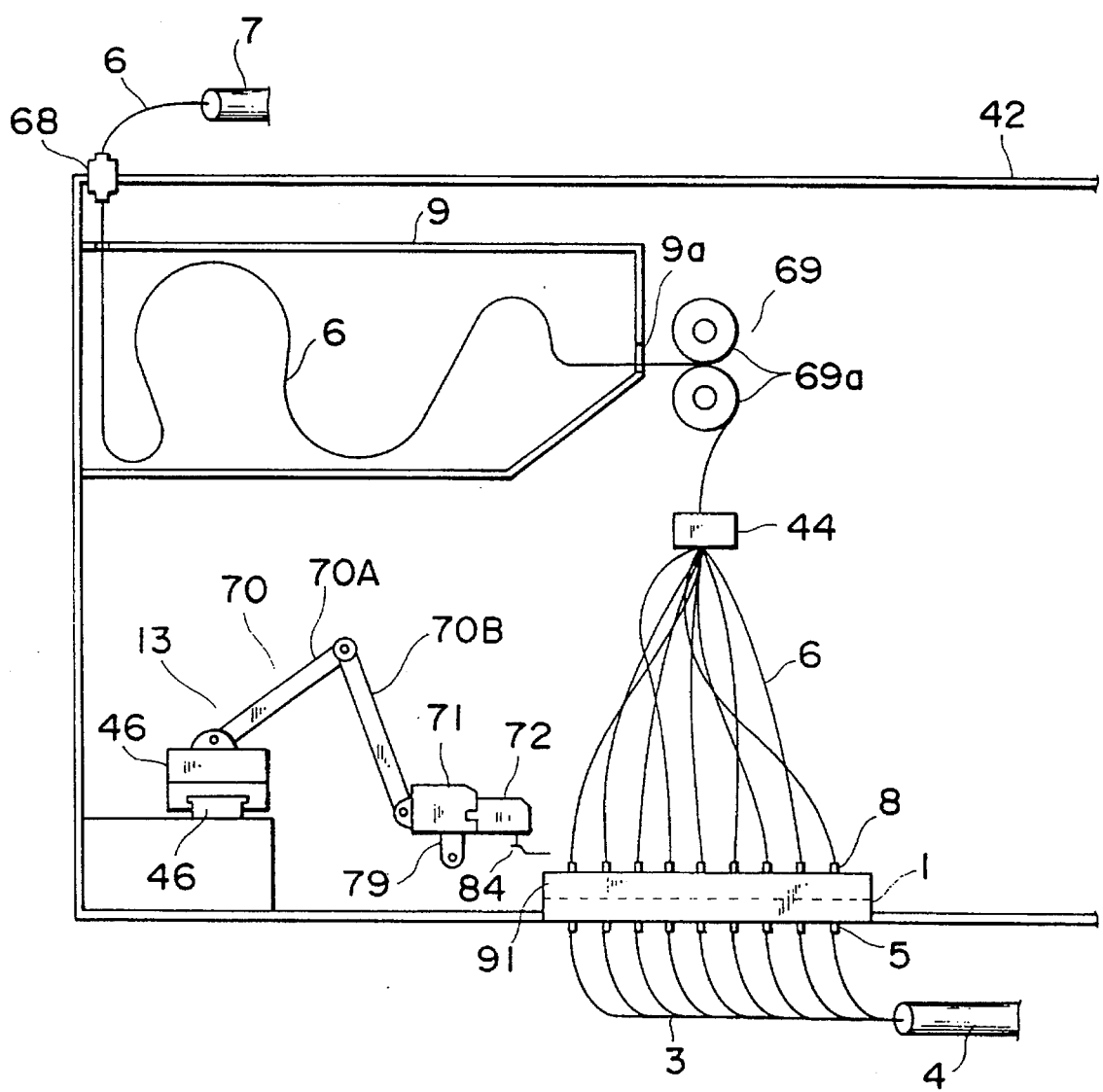
FIG. 12 is a general perspective view of an optical fiber switching device according to an embodiment of a sixth invention of this application.

As shown in FIG. 12, the optical fiber switching device according to the sixth invention comprises a coupling board 1, first optical fibers 3, second optical fibers 6, a robot mechanism 13, a guide groove 91, and a guided lever 79.

Figure 13:
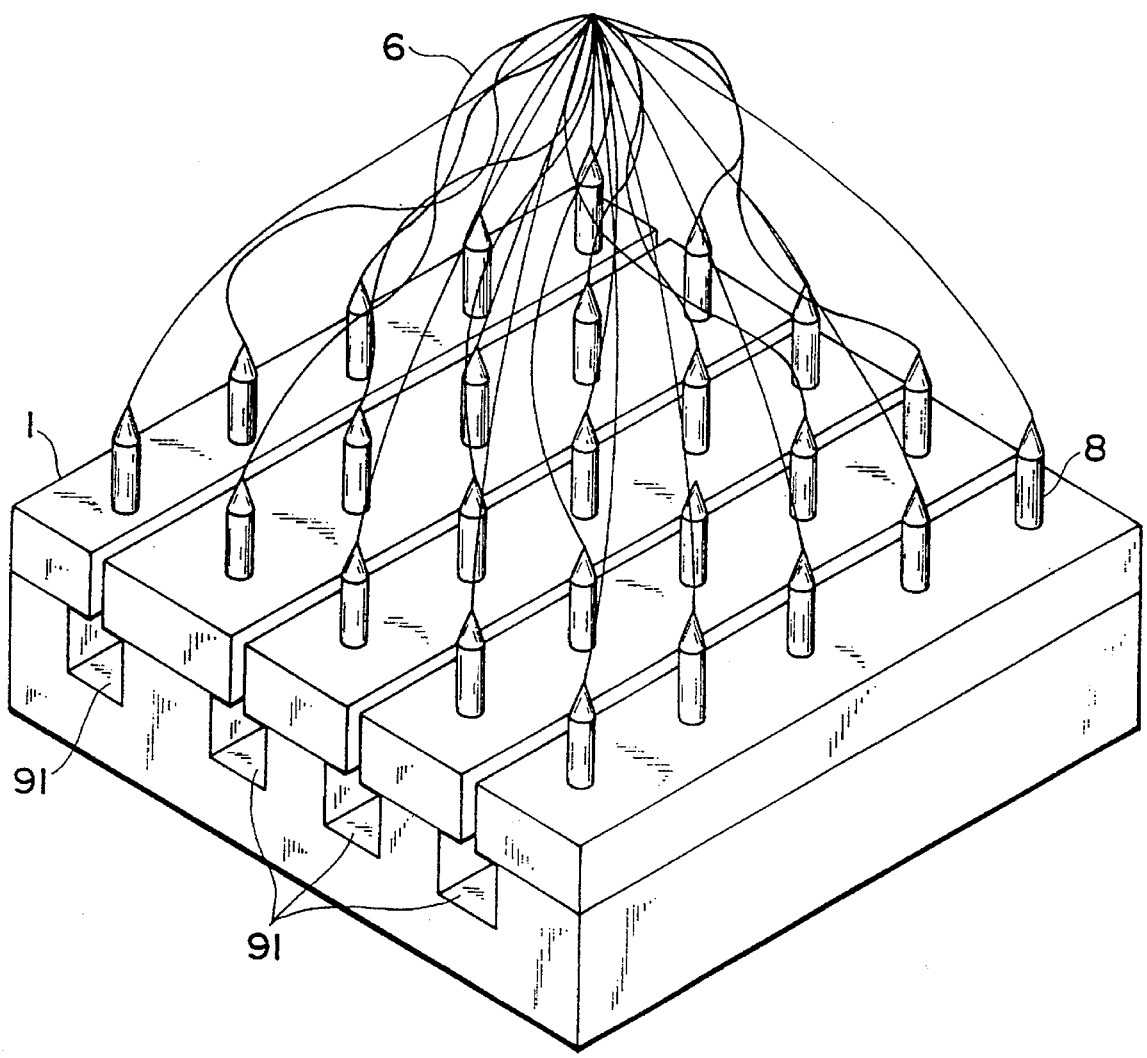
FIG. 13 is a perspective of the coupling board of an optical fiber switching device according to the embodiment of the sixth invention of FIG. 12.
Figure 15:
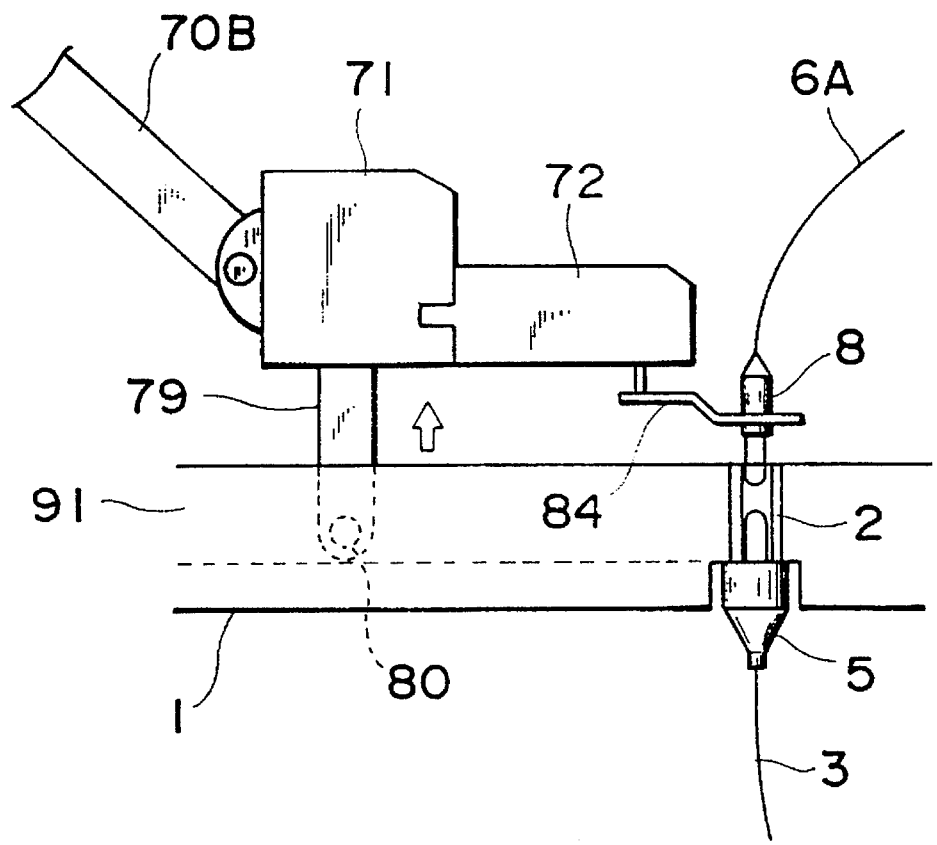
FIG. 15 is a view explaining a pulled-off state of a second optical fiber in the optical fiber switching device according to the sixth invention of FIG. 12.

As shown in FIGS. 12, 13 and 15, the coupling board 1 in the form of a matrix board has rectangular cross-section and has a plurality of cylindrical connector adaptors vertically formed therethrough in a matrix of rows and columns.

The coupling board 1 has connector adaptors for connection fitted in the connector adaptor holes, and is laid on the inside bottom of a substantially box-shaped optical fiber coupling box 42.

As shown in FIG. 12, a plurality of first optical fibers 3 are extended from a first optical cable 4 outside and below the coupling box 42. The ferrules (not shown) on the forward ends of the first optical fibers 3 are inserted in the connectors 5 for connection, and the connectors 5 are detachably inserted in the connector adaptors in the coupling board from below.

As shown in FIG. 12, a plurality of second optical fibers are extended from a second optical cable 7 disposed outside and above the coupling box 42 and are introduced from the optical cable 7 into the coupling box 42 through introduction connectors 68.

The ferrules on the forward ends of the second optical fibers are inserted in connectors 8 for connection, and the connectors 8 are detachably inserted from above in the connector adaptors in the coupling board 1 by way of rotary bodies 69 and a positioning and converging unit 44.

As shown in FIG. 13, the second optical fibers 6 are detachably inserted in the top surface of the coupling board in the matrix of rows and columns, coupled respectively with the first optical fibers 3.

As shown in FIG. 12, the introduction connectors 68 are juxtaposed in a number corresponding to a number of the second optical fibers inwardly as viewed in FIG. 12 on the left side of the ceiling of the coupling box 42.

As shown in FIG. 12, optical fiber length adjusting units 9 respectively have a substantially box-like shape defined by a plurality of plates and are juxtaposed inwardly as viewed in FIGS. 12 on the left side of the interior of the coupling box 42 in a number corresponding to the number of the second optical fibers. A function of the units to store surplus portions of the second optical fibers.

As shown in FIG. 12, the rotary body 69 is disposed near the outlets 9a of the optical fiber length adjusting units 9 and has a plurality of pairs of pulleys 69a which rotatably grip the respective second optical fibers fed at a certain arrangement pitch from the outlets 9a.

Thus the pairs of rotary bodies 69 are rotated to accommodate surplus portions of the second optical fibers for the prevention of the entanglement of the second optical fibers on the top surface of the coupling board 1.

As shown in FIG. 12, the positioning and converging unit 44 is disposed very below the pairs of the rotary bodies 69 to collect the second optical fibers suspended from the pairs of pulleys 69a in a single bundle and positioning the second optical fiber 6 from a lower position.

As shown in FIG. 12, the robot mechanism 13 comprises a guide rail 45 horizontally laid inward as viewed in FIG. 12 on the left side of the interior of the coupling box 42, and a robot body 46 engaged in the guide rail 45 slidably inwardly as viewed in FIG. 12.

An arm 70 is attached to the robot body 46 by a pin swingably upward and downward, and to the forward end of the arm 70 there is attached a head 71 by a pin swingably upward and downward.

As shown in FIG. 12, the arm 70 comprises a first arm 70A upward and downwardly swingably attached to the top of the robot body 46 by a pin, and a second arm 70B upwardly and downwardly swingably attached to the forward end of the second arm 70B by a pin.

The head 71 has a swingable head 72 which is horizontally swingable and is attached by a pin to the forward end of the second arm 70B.

Figure 14:
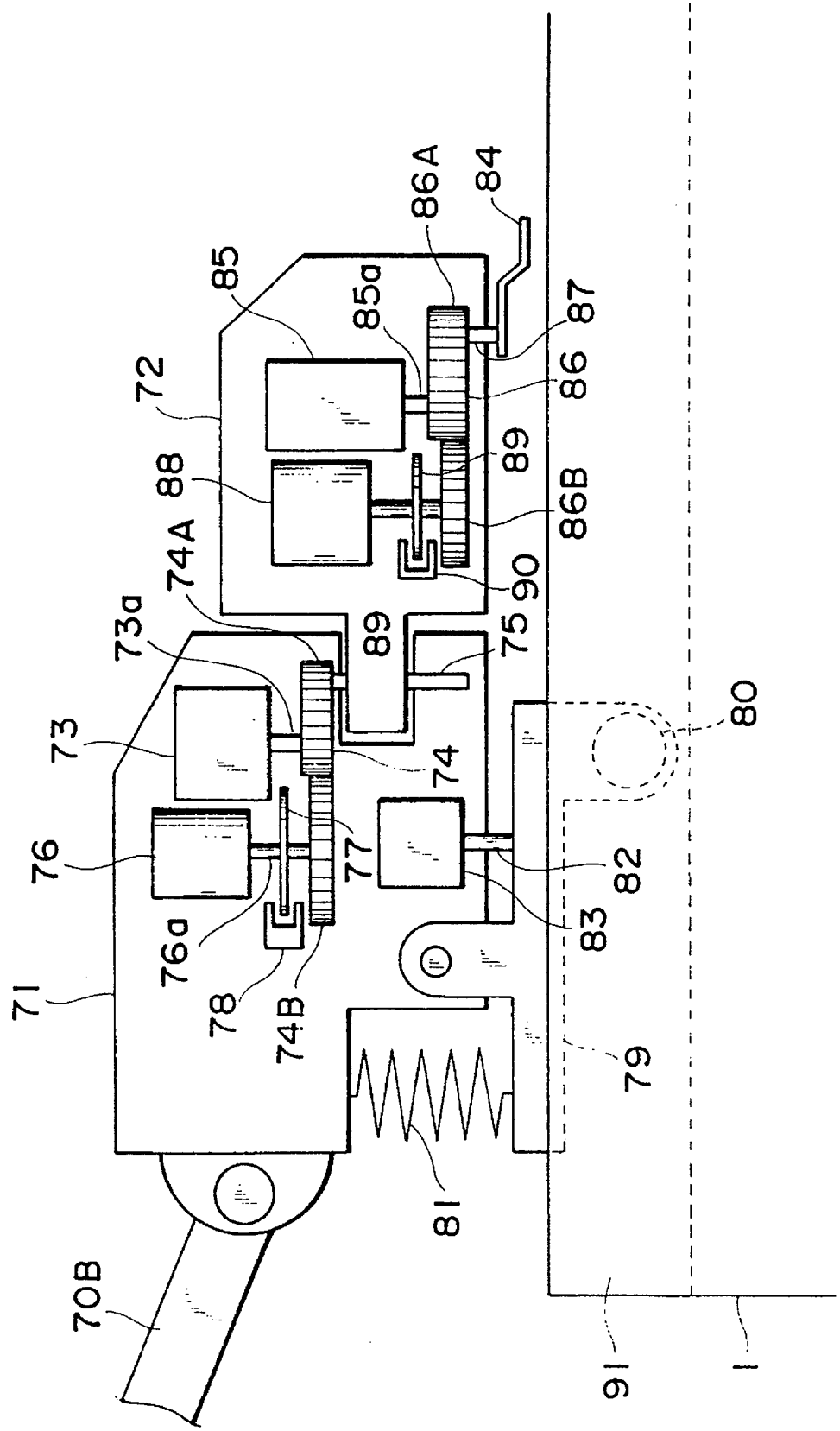
FIG. 14 is a sectional view of a head of a switching robot of the embodiment of FIG. 12.

As shown in FIG. 14, the head 71 accommodates motor 73 for horizontally swinging a swing head 72. A gear 74 which is in mesh with a gear 74A is mounted on a downwardly extended rotary shaft 73a of the motor 73. In the gear 74A there is inserted a rotary shaft 75 which is vertically extended in the head 71 through the swing head 72 for swingably supporting the heads 71, 72.

As shown in FIG. 14, in the head 71, adjacent to the motor 73 there is provided an encoder 76 for the swing head.

On a downwardly extended rotary shaft 76a of the encoder 76 there is mounted a gear 74B which is in mesh with the gear 74 of the motor 73, and a disk 77 with slits (not shown). The peripheral portion of the disk 77 is sandwiched with an optical sensor 78, so that a swing area of the swing head 72 ca be detected.

Figure 16:
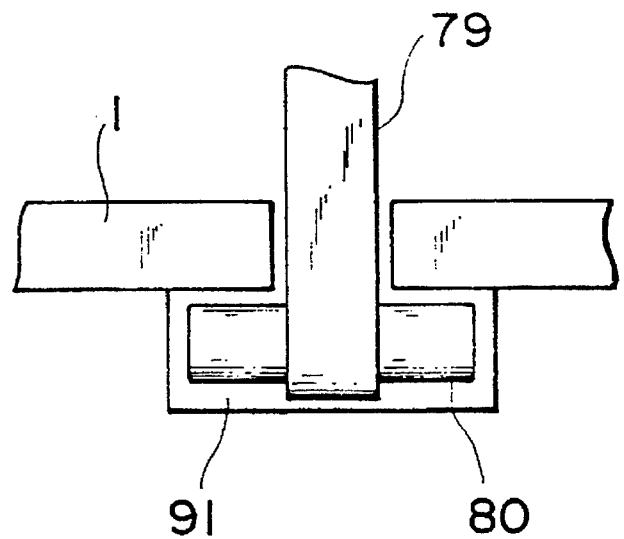
FIG. 16 is a view explaining an engagement of a guided lever of the switching robot in a guide groove, which are involved in the sixth invention of FIG. 12.

As shown in FIGS. 14 to 16, a substantially L-shaped guided lever 79 is mounted upwardly and downwardly swingably on a shaft below the head 71. In a downwardly projected lug of the guided lever 79 there is horizontally inserted an engaging lever 80 which is rotatably engaged in the guide groove 91, which will be explained below.

Between a horizontal end of the guide lever 79 and the bottom of the back side of the head 71 there is vertically expanded a compression spring 81 for urging the guided lever 79A normally upward.

In the head 71 there is further provided a solenoid 83 with a upwardly and downwardly movable pusher rod 82 for pushing down the guided lever 79 when a second optical fiber 6 is pulled out.

As shown in FIG. 14, in the swing head 72 there is provided a motor 85 for horizontally swinging a hand 84. On a downwardly extended rotary shaft 85a of the motor 85 there is mounted a gear 86 which is in mesh with a gear 86A. In the gear 86 there is inserted a rotary shaft 87 which is extended downward and supports a hand 84 on the lower end.

Figure 17:
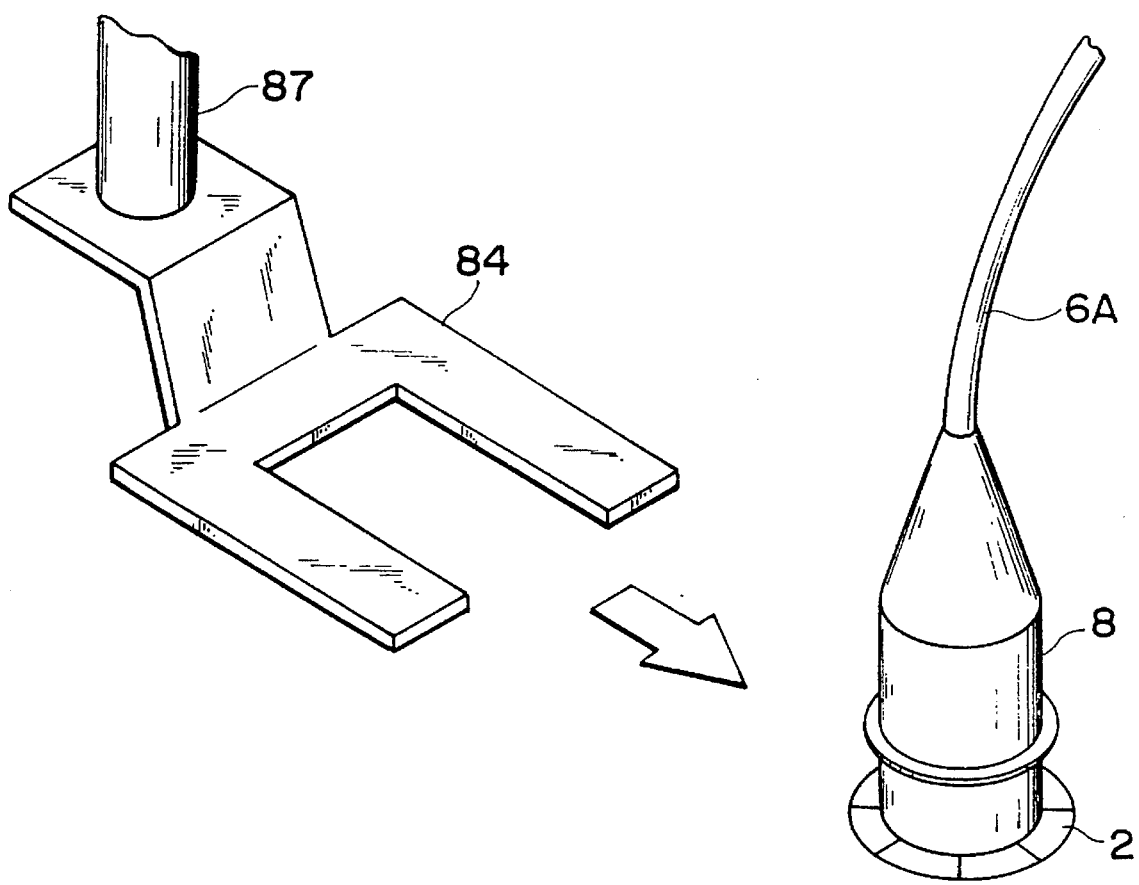
FIG. 17 is a perspective view explaining a relationship between a hand of the switching robot and a second optical fiber, which are involved in the sixth invention.
Figure 18:
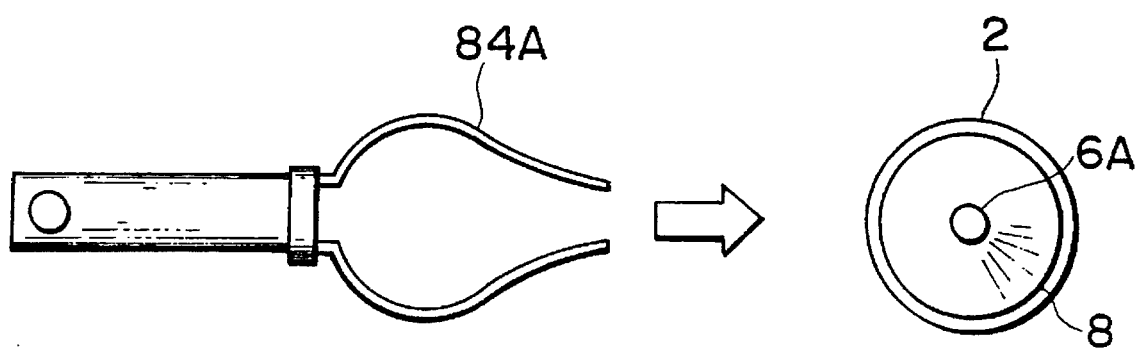
FIG. 18 is a plan view of the optical fiber switching device according to another embodiment of the sixth invention.

As shown in FIG. 17, the hand 84 has fork-shaped cross-section and has the bisected forward ends curved downward. The hand 84 is extended downward below the forward portion of the underside of the swing head 72 and then horizontal. The had 84 is horizontally swung to make the function of pulling out a required second optical fiber gripped between the bisected forward ends and uncoupling the same from a first optical fiber 3.

As shown in FIG. 14, in the swing head 72, adjacent to the motor 85 there is provided an encoder 88 for the hand 84.

On a downwardly extended rotary shaft 89 of the encoder 88 there is mounted a gear 86B which is in mesh with a gear 86 for the motor 85 and a disk 89 with slits (not shown). The peripheral portion of the disk 89 is sandwiched by an optical sensor 90, so that a swing area of the hand 84 can be detected.

As shown in FIG. 13, the guide grooves 91 are formed in the tops surface of the coupling board 1 inwardly, i.e., rom the left to the right as viewed in FIG. 13 between respective rows of the second optical fibers and their adjacent ones.

As shown in FIGS. 14 to 16, when a second optical fiber 6 is pulled out, the lever 80 of the guided lever 79 is engaged in a guide groove 91 loosely with a small gap and functions to smoothly guide and accurately position the head 71 of the robot mechanism 13 in the horizontal direction.

Accordingly when a required second optical fiber 6A is selected out of the second optical fibers 6 coupled with the first optical fibers and switch the required second optical fiber 6A, as shown in FIG. 12 first the robot body 46 of the robot mechanism 13 is slid along the guide rail 45.

Then the robot mechanism 13 is moved from its original position to a position where the robot mechanism 13 is opposed to a guide groove 91 adjacent to the required second optical fiber 6A.

When the robot mechanism 13 arrives at the opposing position and stops there, the arm 70 swings downward to oppose the lever 80 of the heard 71 to the guide groove 91, and the arm 70 is extended to the right as viewed in FIG. 12 to pass or insert the guided lever 79 of the head 71 and the lever 80 through or into the guide groove 91.

Subsequently as the arm 70 is extended, the head 71 is moved to the right along the guide groove 91 and is brought near to the required second optical fiber 6A to be switched.

Then when the head 71 is positioned near the required second optical fiber 6A to be switched, the motor 73 is actuated to rotate the gear 74A in mesh with the gear 74, and the rotary shaft 75 is rotated to swing the swing head 72 toward the required second optical fiber 6A.

The motor 85 is actuated to rotate the gear 86A in mesh with the gear 86, and the rotary shaft 87 is rotated to swing the hand 84 toward the required optical fiber 6A.

Thus the connector 8 of the required second optical fiber 6A is held by the hand 8.

The swing of the swing head 72 and the hand 84 are controlled based on the detection of the encoders 76, 88.

Then when the required second optical fiber to be switched is held by the hand 84, the pusher rod 82 of the solenoid 83 is projected downward to urge downward the upwardly urged guided lever 79. Due to the reaction force the head 71 is moved upward, and accompanying this upward movement of the head 71, the second optical fiber 6A held by the hand 84 is moved upward to be uncoupled from the associated with the first optical fiber 3.

When the pull-out of the required second optical fiber 6A is detected, the associated pair of rotary bodies 69 is rotated to store a surplus portion of the required second optical fiber into the associated optical fiber length adjusting unit 9. Resultantly the required second optical fiber is prevented from entangling with the other second optical fibers on the coupling board 1.

When the required second optical fiber 6A to be switched is pulled out, as the arm 70 is swung to its original position, the head 71 leaves the pull-out position along the guide groove 91 to the left as viewed in FIG. 12, and the guided lever 79 of the head 71 and the lever 80 are disengaged from the guide groove 91.

Then the robot body 46 of the robot mechanism 13 is slid along the guide rail 45 to a position where the robot body 46 is opposed to a guide groove 91 adjacent to the connector adaptor holding a required first optical fiber 3.

Next, when the robot mechanism 13 arrives at the opposing position and stops, the arm 70 is again swung downward to oppose the lever 80 of the head 71 to the guide groove 91. The arm 70 is extended to the right as viewed in FIG. 12 to pass or inserted the guided lever 79 and the lever 80 through or into the guided groove 91.

Then as the arm 70 is extended, the head 71 is moved to the right as viewed in FIG. 12 along the guide groove 91 to be brought near to the connector adaptor of the required first optical fiber 3 for the required second optical fiber to be switched to.

Subsequently when the head 71 is brought near to the connector adaptor of the required first optical fiber 3 for the required second optical fiber to be switched to, the drive motor 73 is actuated to rotate the gear 74A in mesh with the gear 74. The rotary shaft 74 is rotated to swing the swing head 72 toward the connector adaptor 2.

The motor 85 is actuated to rotate the gear 86A in mesh with the gear 86. The rotary shaft 87 is rotated to swing the hand 84 toward the connector adaptor 2.

The swing of the swing head 72 and the hand 84 is controlled based on the detection of the encoders 76, 88 as described above.

When the required second optical fiber to be switched is brought near to the connector adaptor 2, the connector 8 of the held second optical fiber 6A is connected to the connector adaptor 2, and the required second optical fiber is coupled with the required first optical fiber 3.

Thus when the required second optical fiber 6A is connected, as the arm 70 is swung to its original position, the head 71 leaves the connecting position along the guide groove 91 to the left as viewed in FIG. 12, and the guided lever 79 of the head 71 and the lever 80 are disengaged from the guide groove 91.

Subsequently the robot body 46 of the robot mechanism 13 is slid along the guide rail 45 to its original position, and the switching operation is over.

In the above-described arrangement, the robot mechanism 13 in place of an operator selects a required one 6A out of the second optical fibers and switch the same 6A. Resultantly the switching operation and maintenance operations can be much improved.

The head 71 is accurately positioned and guided along a guide groove 91. Resultantly in selecting a required second optical fiber 6A out of the second optical fibers and switching the same, it is expected that the risk of the other second optical fibers which have not been selected being damaged can be securely eliminated.

In this embodiment, the hand 84 of fork-shaped cross-section is used, but instead a hand 84A having a leaf spring of U-shaped cross-section provided on the front, or others may be used with the same functional effect as in this embodiment achieved.

In this embodiment, a plurality of guide grooves 91 are formed in the top surface of the coupling board 1 inwardly as viewed in FIG. 13, but instead a plurality of guide members or the like may be juxtaposed on the top surface of the coupling board 1.

In this embodiment the robot mechanism 13 has the structure as described above, but as long as a robot in place of an operator can select a required one 6A out of the second optical fibers and switch the same, it is needless to say that the configuration, structure, etc. of the robot body 46, the arm 70 or the head 71 may be changed. The sixth invention can use the optical fiber length adjusting units 9 and other member of the above-described inventions other than the sixth invention still with the same functional effects as the sixth invention.

As described above, according to the first invention, one conspicuous effect is that the disadvantage that the second optical fibers gather on the top surface of the coupling board to thereby adversely much lower the coupling operational efficiency, and cause frequent coupling errors can be eliminated without failure.

Another remarkable advantage is that the disadvantage that gathering of a plurality of optical fibers is unavoidably a very serious problem in switching one slide terminal to another required slide terminal can be removed without failure.

Further another remarkable advantage provided by this invention is that since it is unnecessary to secure a large space in the coupling board for coupling optical fibers, the problem of large sizes of the device can be easily solved.

According to the second invention, it can be expected that the disadvantages of great drops of the coupling switching operational efficiency and frequent occurrences of erroneous coupling can be eliminated without failure. The problem that a required second optical fiber entangles with the other second optical fibers, whereby the coupling switching operation is made very difficult is expected to be solved.

A conspicuous effect that the disadvantage that in switching one of the slide terminals is switched to a different one thereof, the conjunction of the second optical fibers is a serious problem can be solved.

Further another remarkable advantage provided by this invention is that since it is unnecessary to secure a large space in the coupling board for coupling optical fibers, the problem of large sizes of the device can be easily solved.

The conspicuous advantage that the problem of large sizes of the device can be easily solved can be expected.

According to the third invention, a plurality of second optical fibers in rows are divided in columns, and besides, a required optical fiber holding unit can be displaced. The resultant advantage is that the switching means can make easier access to the second optical fibers The switching means can make access to a required second optical fiber without contacting the other second optical fibers. Resultantly, in coupling a number of optical fibers, their congestion can be effectively prevented.

According to the fourth invention, conspicuous advantages are that a plurality of second optical fibers gather on the top surface the coupling board, whereby the coupling operational efficiency is much lowered, and erroneous coupling frequently takes place can be eliminated.

Another remarkable advantage is that the disadvantage that gathering of the second optical fibers is unavoidably a very serious problem in switching one slide terminal to another required slide terminal can be removed without failure.

Further another remarkable advantage is that since it is unnecessary to secure a large space in the coupling board for coupling optical fibers, the problem of large sizes of the device can be easily solved.

A conspicuous advantage that since the optical fiber holding units are displaced into the paths of the switching means, the switching means can very easily hold a required second optical fiber can be expected.

Furthermore, a conspicuous advantage is that since the switching means is compact, the switching means is expected to be miniaturized, and the miniaturization can make the coupling board denser.

Furthermore, in the fourth invention, a force which has been acting radially inwardly on the side wall of the ferrule chuck is removed or weakened as the release button is lowered to cause the ferrule chick to restore its original configuration, and the ferrule chuck is released from its required second optical fiber holding state.

A resultant remarkable effect is that the disadvantage that a required second optical fiber comes off the coupling board due to a cause and adversely uncoupled from a first optical fiber can be removed.

Furthermore, a conspicuous effect is that the disadvantage that the device is not applicable to large-capacity optical communications used on the side of subscribers because one of a number of optical fibers arranged in a matrix is coupled with a single master fiber connected to a slide terminal can be easily removed.

According to the fifth invention, since the switching means in place of an operator automatically switches a selected second optical fiber, the conspicuous effects that the coupling switching operational efficiency is much improved, and the running cost can be lowered can be provided. An expected conspicuous effect is that the maintenance operational efficiency can be much improved.

Furthermore, a conspicuous effect is that since the constraining means brakes without failure the rotation of the rotary bodies gripping the second optical fibers which have not been selected, the non-selected second optical fibers can be prevented from damages.

According to the sixth invention, a conspicuous effect is that since the switching means in place of an operator selects a required one out of a plurality of second optical fibers and switches the same, the coupling switching operational efficiency and maintenance operational efficiency can be much improved.

Another effect is that since the switching means is accurately guided and positioned by the guide means, it is expected that when a required second optical fiber is selected out of the second optical fibers and switched, the other second optical fibers which have not been selected can be securely prevented from damages.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. An optical fiber switching device comprising a plurality of fiber holding units making up a coupling board; a plurality of first optical fibers connected in one surface of the coupling board in arrangement; a plurality of second optical fibers connected in another surface of the coupling board in arrangement to be coupled with the first optical fibers; an optical fiber length adjusting unit for handling surplus portions of the second optical fibers; partition means for dividing said another surface of the coupling board in a plurality of rows; slide means for displacing a selected optical fiber holding unit of the optical fiber holding units in a direction of rows of the arrangement of the second optical fibers in between the associated rows with the selected second optical fiber; and then the selected second optical fiber displaced in between the associated rows is switched from the connection position on the coupling board where the selected second optical fiber has been connected to a different one of the connection positions on the coupling board to be coupled with the associated first optical fiber.

2. An optical fiber switching device according to claim 1, wherein a plurality of connector adaptors are buried in each of the optical fiber holding units; the optical connectors of the second optical fibers are connected to the connector adaptors to form rows of the second optical fibers.

3. An optical fiber switching device according to claim 2, wherein a part of each of the optical connectors provided on the second optical fibers are exposed from said another surface of the coupling board.

4. An optical fiber switching device according to claim 1, wherein the optical fiber holding units are laid one on another between a pair of plates in a direction perpendicular to the connector adaptors; and each of the optical fiber holding units is displaceable in a direction of the row of the associated second optical fibers.

5. An optical fiber switching device according to claim 1, wherein the coupling board is positioned horizontal, the first optical fibers are connected in arrangement to the connector adaptors in the coupling board from below, and the second optical fibers are connected in the arrangement to the connector adaptors in the coupling board from above.

6. An optical fiber switching device according to claim 1, wherein the optical fiber length adjusting unit comprises a plurality of optical fiber length adjusting blocks for letting in the second optical fibers from above, and housings disposed above the optical fiber length adjusting blocks for stowing surplus portions of the second optical fibers, the optical fiber length adjusting blocks feeding the respective second optical fibers from the undersides thereof to the top surface of the coupling board.

7. An optical fiber switching device according to claim 6, wherein the optical fiber length adjusting blocks are laid one on another in the horizontal direction.

8. An optical fiber switching device according to claim 6, wherein each of the optical fiber length adjusting blocks accommodates a pair of rotary reels on which the associated one of the second optical fibers is wound.

9. An optical fiber switching device according to claim 8, wherein each of the optical fiber length adjusting blocks accommodates a flexible member for spacing the reels of the pair from each other.

10. An optical fiber switching device according to claim 1, wherein the partition means comprise a plurality of substantially U-shaped rods, and the respective rods are bridged between a pair of plates.

11. An optical fiber switching device according to claim 10, wherein the rods are bridged in a direction of the layers of the optical fiber holding units and are positioned above the connector adaptors.

12. An optical fiber switching device according to claim 1, wherein the slide means is provided adjacent to the optical fiber holding units; and a plurality of reciprocable levers are connected to the respective optical fiber holding units; and the associated lever with a selected one of the optical fiber holding units is operated based on an applied voltage.

13. An optical fiber switching device according to claim 1, wherein the switching means is provided by a robot mechanism disposed near the coupling board.

14. An optical fiber switching device according to claim 13, wherein the robot mechanism comprises X-directional rotary screw rods disposed horizontal and opposed to each other; X-directional nuts which the respective X-directional rotary screw rods are inserted in and are movable as the X-directional screw rods are rotated; a Z-directional screw rod supported vertical by the X-directional nut and being rotatable; a Z-directional nut which the Z-directional screw rod inserted in and is movable upward and downward as the Z-directional screw rod is rotated; a reciprocable arm portion supported horizontal by the Z-directional nut; and a hand portion provided on the forward end of the arm portion for holding a part of the optical connectors of the second optical fibers exposed from the surface of the coupling board.

15. An optical fiber switching device according to claim 14, wherein each of the pair of X-directional screw rods are provided by a round rod member, and a screw groove is formed in the outer peripheral surface of the round rod member.

16. An optical fiber switching device according to claim 14, wherein each of the X-directional nuts has a hole through which the associated X-direction screw rod is passed, and a screw groove is formed in the inside peripheral surface of the hole.

17. An optical fiber switching device according to claim 14, wherein the Z-directional screw rod is provided by a round rod member, and a screw grove is formed in the outer peripheral surface of the round rod member.

18. An optical fiber switching device according to claim 14, wherein the Z-directional nut has a hole through which the Z-directional screw rod is vertically passed, and a screw groove is formed in the inside peripheral surface of the hole.

19. An optical fiber switching device according to claim 14, wherein the pair of X-directional screw rods and the Z-directional screw rod are rotatable independent of each other.

20. An optical fiber switching device according to claim 14, wherein the hand portion is provided by a substantially U-shaped member.

* * * * *